United States Patent [19]

Tung

[11] 3,984,529

[45] Oct. 5, 1976

[54] PROCESS FOR RECOVERING SULFUR BY REMOVAL OF SULFUR DIOXIDE FROM GASEOUS MIXTURES

[76] Inventor: Shao E. Tung, 205 Rawson Road, Brookline, Mass. 02146

[22] Filed: Aug. 22, 1974

[21] Appl. No.: 499,582

[52] U.S. Cl. .............................. 423/575; 423/242; 55/73
[51] Int. Cl.² ........................................ C01B 17/04
[58] Field of Search ........... 423/242, 243, 539, 574, 423/575; 55/73; 210/21

[56] References Cited
UNITED STATES PATENTS

| | | | |
|---|---|---|---|
| 1,783,901 | 12/1930 | Bottoms | 423/243 |
| 1,946,489 | 2/1934 | DeJahn | 55/73 |
| 2,987,379 | 6/1961 | Urban | 423/575 |
| 3,103,411 | 9/1963 | Fuchs | 423/22 |
| 3,620,674 | 11/1971 | Renault et al. | 423/243 X |
| 3,633,339 | 1/1972 | Wiewiorowski et al. | 423/242 X |
| 3,833,710 | 8/1974 | Deschamps | 423/242 X |
| 3,882,222 | 5/1965 | Deschamps | 423/575 |

*Primary Examiner*—G. O. Peters
*Attorney, Agent, or Firm*—Laney, Dougherty, Hessin & Fish

[57] ABSTRACT

A process for removing sulfur dioxide from a mixture of gases and converting the removed sulfur dioxide to elemental sulfur. The sulfur dioxide is first converted to one or more condensed phase sulfite compounds by contacting the gaseous mixture with an appropriate removal reactant selected from the group consisting of certain bases, and alkali metal salts of weak acids with strong bases in aqueous solutions having a pH of at least 4. The condensed phase sulfite compounds are then reacted with certain organic nitrogen containing transfer compounds which are water insoluble to form organic soluble nitrogen containing sulfite salts disposed in an organic liquid phase. The organic, nitrogen containing sulfite salts are then, while in the organic phase, subjected to contact with hydrogen sulfide to yield elemental sulfur.

60 Claims, 4 Drawing Figures

PROCESS FOR RECOVERING SULFUR BY REMOVAL OF SULFUR DIOXIDE FROM GASEOUS MIXTURES

BACKGROUND OF THE INVENTION

1. Field of the Invention

This invention relates to processes and apparatus for removing relatively small quantities of noxious sulfur dioxide gas from gaseous mixtures. More particularly, the present invention relates to processes for removing trace quantities of sulfur dioxide by subjecting the sulfur dioxide in a gaseous mixture to chemical interaction with a removal composition adapted to yield a condensed phase mixture containing sulfite compounds, and then converting such compounds to useful, easily handled elemental sulfur.

2. Brief Description of the Prior Art

The economic removal of sulfur dioxide from gaseous industrial effluents is a difficult problem which has defied satisfactory solution to the present time, but which has become a subject of intensified scrutiny as concern for atmospheric pollution and ecological contamination has increased. The difficulty of economic and efficient removal has arisen essentially from the fact that the sulfur containing gases are generally present in very low concentrations in an enormously large, rapidly produced stream of industrial effluent gas, particularly the stack gas from boilers.

Many proposals have been advanced, and actual attempts undertaken, to economically and efficiently remove the sulfur dioxide from stack gas streams and many of these attempts have involved an effort to incorporate a scrubbing zone through which the effluent gas is passed, and there absorbed into an absorbing liquid and retained as condensed phase sulfur compounds. Generally, scrubbers which have been able to efficiently remove sulfur dioxide by this technique have been huge in size, and the capital investment for the installation of such scrubbers has been correspondingly high. For large source applications, high equipment cost aside, the shear enormity of equipment size has frequently been found objectionable.

While the prior art scrubbing technology is as yet unsatisfactory in the size of equipment needed, a reasonably acceptable technology in the subsequent scrubbing liquor regeneration and recovery is equally lacking. The regeneration procedures have frequently entailed thermal regeneration of the scrubbing compounds, and often such thermal regeneration has employed steam as the heat source. This has entailed a very high cost to supply the heat necessary for effective thermal regeneration. In some types of the cyclical methods in which the scrubbing agent is regenerated, such regeneration is accompanied by release of $SO_2$ as a concurrently yielded product. While the $SO_2$ is then in more concentrated and more easily controlled and disposable form than when it is discharged to the atmosphere in small quantities in the stack gas, it nevertheless remains a noxious material, and generally must be further treated for conversion to a more economic and easily disposed of form (such as conversion to sulfuric acid) after its production in the process of regenerating the scrubbing compound.

In some instances, attempts to achieve cyclic operation by a regeneration of the scrubbing compound have been foregone, but in such instances, the chemical cost through loss of the scrubbing compound has been very high, and a problem of disposal of the product materials in an economic and ecologically satisfactory manner has plagued such noncyclic operations. Thus, in a scrubbing procedure in which lime is used and calcium salts are produced, the cost and volumetric space required in the disposal of the large amounts of such salts impart a severe economic impediment to the feasibility of such non-regenerative method of abatement.

BRIEF DESCRIPTION OF THE PRESENT INVENTION

The present invention is a process for efficiently removing sulfur dioxide from gaseous mixtures, and ultimately converting the sulfur in the sulfur dioxide so removed to solid, elemental sulfur, while economically regenerating the various reactants used in the several steps of the cyclic process. The process employs comparatively small size equipment, consumes very little steam and generates little or no waste material.

Broadly described, the overall process of the invention comprises, first, converting the sulfur dioxide, present in small amounts in the gaseous mixture from which it is to be removed, to one or more condensed phase sulfite or thiosulfate compounds which can be subsequently converted to elemental sulfur through certain novel steps utilized in the process. In general, the scrubbing step is accomplished by scrubbing the gaseous mixture with a scrubbing composition containing certain compounds capable of reacting with the sulfur dioxide present to form sulfites and/or hydrosulfites. In one embodiment of the invention which is specially designed for large source application, the scrubbing procedure is combined with a preceding or concurrently occurring aerosol formation step in which the gaseous mixture containing the sulfur gases is contacted with a reactant in the gas phase or present as a mist and capable of forming an aerosol in which are entrained solid, easily recovered, sulfur compound products of the type described. One aspect of the present invention which should be mentioned at this point, and which can be beneficially employed in one of the preferred practices of the invention, is a novel and improved apparatus for carrying out the described aerosol formation-scrubbing procedure for removal of the sulfur gases.

The next step in the broadly described process of the present invention is the conversion of the sulfur compounds in the scrubbing liquor to a form which renders the resultant sulfur containing reaction products susceptible to efficient and economic conversion to a final solid sulfur product, with concurrent regeneration of the effective component of the scrubbing liquor for recycling to the scrubbing stage. This conversion entails a transfer reaction in which the sulfites and hydrosulfites in the spent aqueous scrubbing liquor are brought into contact with a water immiscible transfer reactant which may be dissolved in an organic solvent, or may itself function and exist as an organic phase distinct from the aqueous scrubbing liquor phase, whereby the cations of the sulfites and hydrosulfites derived from the scrubbing compound are replaced by alkyl ammonium ions or quaternary ammonium ions, and simultaneously the sulfite ions are transferred from the aqueous scrubbing liquor to the organic phase. Appropriate water immiscible transfer reactants include long chain alkyl amines, long chain alkyl amine salts, quaternary ammonium bases and their salts.

In the final step of the process of the invention, the organo-sulfite salts formed in the transfer reaction are reduced by contact with hydrogen sulfide to yield elemental sulfur, and to regenerate the transfer reactant (amine, amine salt, quaternary ammonium base or salt thereof). The hydrogen sulfide may be provided for the reduction reaction either by direct admission to the organo-sulfite salt formed in the transfer reaction, or by reason of having previously been introduced into the scrubbing liquor, or by having been previously absorbed in the transfer reactant used in the transfer reaction.

The process of the present invention provides a number of advantages over prior art processes. In conventional prior art processes, the scrubbing of the stack gas is a diffusional control process which is not a particularly fast process, and requires very large equipment to effectively scrub the large volume of flue gas which must be treated. By initially forming an aerosol, then effecting removal of aerosol particulates by cooling, condensation and scrubbing, as is practiced in one of the preferred embodiments of this invention using a novel apparatus, the rate of $SO_2$ removal is greatly increased, and the equipment size can be reduced very significantly, in some instances as much as several orders of magnitude.

In using the transfer-reduction procedure entailed in the second and third steps of the process of the invention, a rapid and efficient regeneration of the scrubbing liquor and almost concurrent production of solid, elemental sulfur are achieved. I have discovered that certain water insoluble organic sulfites can be reduced to elemental sulfur readily by hydrogen sulfide. Although the reason that these organic sulfites are so readily reducible in the organic phase environment in which such reduction is carried out in the present invention (as contrasted with the reduction of sulfite salts in an aqueous solution, which occurs only with considerable difficulty) is not precisely known, it appears that the organic phase reduction here used circumvents one or more of the high activation energy intermediate reduction steps which are rate controlling in the aqueous phase reduction. Surprisingly, I have found that sulfur precipitates readily at a pH value as high as 7 in the organic phase sulfite reduction carried out in accordance with the present invention, whereas prior reductions of sulfites carried out in the aqueous phase have generally been thought to require a pH of less than about 4 or 5.

Among the object sought and advantages achieved by the process and apparatus of the present invention are:

The size of the equipment required to carry out the process is small in comparison to the equipment previously used to remove noxious gases from industrial effluent gases.

The process of the invention requires a relatively low capital investment cost.

The operating cost of the process of the invention is low.

The process of the invention is highly reliable for continuous and uninterrupted operation.

The process directly produces coarse, granular easily handled elemental sulfur as product.

The process of the invention generates little or no waste by-product material presenting a disposal problem.

Except for the final elemental sulfur product, all other process streams are pumpable.

The process presents no severe corrosion problem.

All major process steps can be operated at room temperature and atmospheric pressure.

For large source application, one embodiment of the invention employs an efficient and fast aerosol-scrubbing technique which is capable of removing substantially all $SO_2$ from stack gas, coupled with a transfer-reduction procedure which enables the scrubbing liquid and aerosol forming reactant to be easily and quickly regenerated while directly yielding elemental sulfur as the primary derivative of the removed sulfur gases.

In the aerosol-scrubbing section of the apparatus used in practicing the invention, the pressure drop is small, the rate of $SO_2$ removal is very fast, and because of the relatively short residence time, very little of the sulfite which is formed is oxidized to sulfate. Moreover, the unit has good tolerance to solid particulate materials entrained in the stack gases.

Additional objects and advantages of the invention will become apparent as the following detailed description of preferred embodiments of the invention is read in conjunction with the accompanying drawings which illustrate certain aspects of the invention.

BROAD DESCRIPTION OF THE DRAWINGS

DETAILED DESCRIPTION OF PREFERRED EMBODIMENTS OF THE INVENTION

The Scrubbing Step

As has been previously indicated, the present invention functions effectively in the removal of very small amounts of sulfur dioxide from large volumes of gaseous mixtures in which sulfur dioxide is entrained. In instances where the volume of the effluent gas is not extremely large, such as the effluent gases from a small sulfuric acid plant, a small smelter or even a small power plant using a high sulfur fuel, the use of a conventional type scrubber for carrying out the first step of the process of this invention may not be particularly disadvantageous. In one embodiment of my invention, where a conventional scrubber is used in conjunction with the transfer-reduction procedure of the present invention, such conventional scrubber and utilization of the present invention are particularly suited for such small source applications. Where the application is directed toward the cleaning up of a large source of industrial effluent gases, such as stack gases from a large power plant (where the gases are discharged at high rates and large volumes), the application of my aerosol-former-scrubbing apparatus becomes highly desirable. A different embodiment of the invention which embodies the use of both the aerosol formation-scrubbing technique and the transfer-reduction procedure is especially appropriate for these large source applications.

Figure 1:
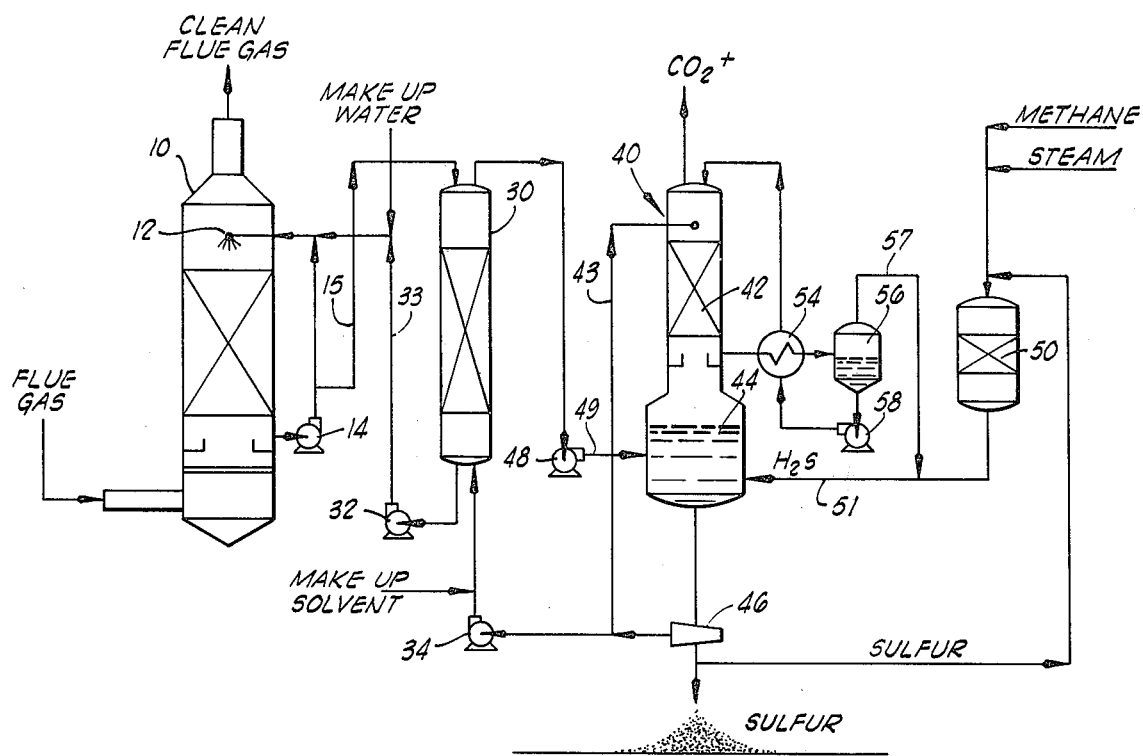
FIG. 1 is a process flow diagram of one embodiment of my invention as it may be carried out using a conventional scrubber, and is particularly suitable for small source applications.

Considering first the use of the conventional gas scrubber column 10 of the type depicted in FIG. 1 of the drawing, a stream of contaminated flue gas or effluent gas is charged to the column at the lower end thereof after having preferably been deashed to remove solid ash particles by any of several techniques well understood in the art. In the scrubber 10, removal of sulfur dioxide occurs by the formation of water soluble sulfites as the effluent gases containing the sulfur dioxide contaminants enter the scrubbing liquor. The scrubbing liquor chosen is a material capable of capturing and carrying a large amount of sulfur dioxide in the form of soluble hydrosulfite and/or sulfite salts without yielding a significant partial pressure of sulfur dioxide to the gas phase.

The partial pressure of sulfur dioxide in the gas phase over an aqueous sulfite solution is prescribed by the following equilibrium relationships:

$$SO_2 + H_2O \rightleftharpoons H_2SO_3 \rightleftharpoons H^+ + HSO_3^- \quad (1)$$

$$k_1 = \frac{(H^+)(HSO_3^-)}{(H_2SO_3)} \quad (2)$$

or $$\frac{(H_2SO_3)}{(HSO_3^-)} = \frac{(H^+)}{k_1} \quad (3)$$

in which the terms in parentheses are concentration terms, and $k_1$ designates the first ionization constant of sulfurous acid ($H_2SO_3$). Further ionization of hydrosulfite to sulfite is here neglected. These relationships signify that the partial pressure of sulfur dioxide in the gas phase is substantially proportional to the concentration of non-ionized sulfurous acid in the liquid phase. The dissolved sulfur dioxide, however, can also exist as hydrosulfite ions, and proportioning between the non-ionized and ionized species of sulfite depends on hydrogen-ion concentration, pH, as well as the ionization contant, $k$. Consequently, if the removal compound dissolved in the scrubbing solution is such that the hydrogen-ion concentration is buffered at 1/150 the value of $k_1$, 1/150 of the total dissolved sulfur dioxide will exist in the solution as non-ionized sulfurous acid and the solubility of sulfur dioxide in the aqueous solution of removal compound will then be approximately 150 times its solubility in water.

The ionization constant $k_1$ is $1.54 \times 10^{-2}$ at 25°C. If 150 times better $SO_2$ solubility than in water is adopted as the desirable minimum dissolving capacity that a scrubbing solution should have to warrant any practical consideration, then this scrubbing liquor should be buffered at a hydrogen ion concentration of $(1/150) \times 1.54 \times 10^{-2}$, or $1.03 \times 10^{-4}$, or a pH of 3.99 (or aproximately 4). The pH of the scrubbing liquor (containing the removal compound) should thus be at least 4.

The absorption of sulfur dioxide by the removal reactant may be generally described as, $$SO_2 + H_2O + A^{z-1} \rightleftharpoons HSO_3^- + (HA)^z \quad (4)$$

where the removal reactant $A^{z-1}$ is any substance capable of acting as a proton acceptor, and is a base according to Bronstead theory.

The removal reactants employed can be broadly classified as including (a) gaseous materials which are capable of reacting in the gas phase with the sulfur dioxide present in small quantities in the mixture of gases from which it is to be removed, and (b) aqueous solutions of certain bases, and of salts of strong or moderately strong bases and weak acids. The gaseous removal reactants include ammonia gas and certain gaseous alkyl amines. The second broad category of removal reactants includes water soluble, relatively basic materials which, in solution, provide a scrubbing liquor or solution having a pH of at least 4. Generally, these water soluble removal reactants include water soluble bases of alkali metals and ammonia, and certain water soluble salts derived from alkali metals and ammonia as hereinafter more specifically defined.

Examples of water soluble bases useful in scrubbing reactants used in the present invention in the form of aqueous solutions contacted with the sulfur dioxide include sodium hydroxide, potassium hydroxide, ammonium hydroxide, amines and diethanolamine. Examples of suitable salts include sodium carbonate, potassium sulfite, sodium hydrocarbonate, sodium sulfide, sodium hydrosulfide, potassium sulfide, sodium acetate, sodium sulfite and sodium monohydrogenphosphate.

Where the scrubbing solution consists of a strong or moderately strong base-weak acid salt in aqueous solution, the solution is buffered to provide the strongest buffering action, which status occurs when the hydrogen ion concentration is about equal to the ionization constant of the weak acid from which the salt is derived. Therefore, considering the pH limitation hereinbefore described, to warrant practical consideration as a strong base-weak acid salt useful as a removal reactant in the present invention, the pKa of the parent acid of the salt must be larger than 4. It also follows from the pH limitation previously described that where bases are employed as the removal reactant, the base must be buffered to provide a hydroxyl ion concentration of the aqueous solution containing the base of about $1 \times 10^{-10}$ (corresponding to the minimum pH level of about 4). Therefore, the desirable dissociation constant pKb of bases employed in aqueous solution for sulfur dioxide removal is not greater than 10. Here, the terms pKa and pKb relate to the acid and base dissociation constants, respectively.

In examining the $SO_2$ absorption conditions more closely, the following equilibrium relationships are derived for a salt buffered system:

$$S = \frac{(H^+)^2 + k_1(H^+) + k_1k_2}{k_1(H^+) + 2k_1k_2}\left[(H^+) + \left\{\frac{k_b(H^+)}{k_w + k_b(H^+)} - \frac{k_a}{k_a + (H^+)}\right\}C - (OH^-)\right] \quad (5)$$

$$P_{SO} = \frac{h(H^+)^2}{(H^+)^2 + k_1(H^+) + k_1k_2} \cdot S \quad (6)$$

where $S$ is the total molar concentration of dissolved $SO_2$ in moles per 1000 grams of water; $C$ is the total molar concentration of the anions present in the original salt (removal reactant), $P_{SO_2}$ is the partial pressure of the sulfur dioxide in the gas phase, $k_a$ and $k_b$ are the acid and base ionization constants of the parent acid and base that form the salt removal reactant; $k_1$, $k_2$ are the ionization constants of sulfurous acid, h is a Henry law constant for sulfur dioxide in water and $k_w$ is the water ionization constant, or $10^{-14}$.

Equations (5) and (6) can be used to compute the minimum pKa value a weak parent acid of an alkali metal or ammonium salt (removal reactant) must have, in order to achieve a desired level of equilibrium sulfur loading (solution of $SO_2$) under a certain set of operating conditions. Thus, for example, if the concentration of a removal reactant in the scrubbing liquor is 8 moles/100 moles water (which is a convenient concentration of the scrubbing liquor to use in actual application. For some salts, even higher concentration is permissible by their solubilities), and the sulfur dioxide concentration in the gaseous mixture from which it is to be removed is 2000 ppm, and the scrubbing liquor temperature is 150°F., then the pKa of the parent weak acid from which the salt used as removal reactant is derived must exceed 7.2 (or about 7) in order to achieve a 90 percent sulfur loading (i.e., S/C=0.9). This minimum pKa value decreases to 5.1 (or about 5) to achieve a 70 percent equilibrium sulfur loading if the corresponding operating conditions are: 4 moles/100 moles water, 5000 ppm and 100° F., respectively. From this computation, it can be seen that if a salt of a strong or moderately strong base (alkali metal and ammonium hydroxides) and a weak acid is used as the removal reactant, the pKa of the parent weak acid should be at least larger than 4 and is preferably larger than 5. Further, the computation demonstrates that for best results, the pKa of the parent weak acid should be larger than 7. Correspondingly, where bases are employed as the removal reactants the $pk_b$ values of such base should be at least smaller than 10, is preferably smaller than 9, and for best results is smaller than 7.

Referring back to FIG. 1, the scrubbing liquor is continuously recirculated within the scrubbing column 10 by a suitable pump 14, but a portion of the total scrubbing liquor withdrawn from the tower is continuously being circulated to the transfer-reducer section of the process as hereinafter described. In lieu of a scrubbing column, other conventional types of scrubbers, known to those skilled in the arts, such as a Venturi scrubber, or a Venturi rod scrubber can also be used.

Inside the scrubbing tower 10, the prevailing reaction which has already been generally described by Equation (4) may be further illustrated when one of the aforementioned specific salt-containing scrubbing liquors is used as follows:

$$NaAc + SO_2 + H_2O \rightarrow NaHSO_3 + HAc \qquad (7)$$

(where Ac designates an acetate ion);

$$Na_2SO_3 + SO_2 + H_2O \rightarrow 2NaHSO_3 \qquad (8)$$

$$Na_2HPO_4 + SO_2 + H_2O \rightarrow NaHSO_3 + NaH_2PO_4 \qquad (9)$$

$$Na_2S + SO_2 + H_2O \rightarrow NaHSO_3 + NaHS \qquad (10)$$

Where an aqueous solution scrubbing liquor is employed in a conventional type scrubber, the preferred removal compounds utilized are, sodium hydrosulfide, sodium sulfite, sodium monohydrogenphosphate, ammonium sulfite and ammonium monohydrogenphosphate. Toward a better understanding of the reaction mechanisms involved in the removal and subsequent transfer and reduction steps of the reaction, it can be helpfully pointed out that the reaction products, sodium hydrosulfite and sodium hydrosulfide produced by scrubbing Reaction (10) will further interact to yield several intermediate sulfur containing compounds, including sodium thiosulfate. Several species of these intermediate sulfur containing compounds can and do coexist in the spent scrubbing liquor, with the sulfur in such intermediate compounds generally having a valence state of between that of the sulfite (+4) and that of the sulfide (−2). The formation of such intermediate compounds, including the sodium thiosulfate, however, does not interfere with the overall course of the process of the present invention, since these compounds are unstable and will subsequently, during the reduction step, convert to elemental sulfur, the end product sought.

Where conventional scrubbing of the sulfur dioxide from the effluent gases is effected, there is involved an essentially diffusional control process. For an impurity molecule to be removed from the gas stream by the scrubbing liquid, it must first diffuse through a gas film, then be dissolved into the liquid and then diffused through a liquid film into the liquid bulk. An advantage of the improved aerosol formation-scrubbing technique, hereinafter described in greater detail and proposed by this invention, over the conventional scrubbing process, is that the diffusional processes involved in conventional scrubbing are not extremely fast processes, and the rates at which these processes proceed set an upper rate limit for the overall scrubbing operation. This limiting rate, together with the large gas volume to be handled in the case of many industrial effluent gases charged to the scrubber, coupled also with the small concentration of sulfur dioxide in most such effluent gases, make the equipment size which is required in order to achieve adequate efficiency in sulfur dioxide removal extremely large. Thus, typically, for a 1000 megawatt utility plant, using a 3 weight percent sulfur coal as an energy source, the volume of flue gas to be treated amounts to as large as 145 million standard cubic feet per hour, and the sulfur dioxide content in this large volume of gas is only about 0.2 percent, or 2000 parts per million. For efficient scrubbing to remove a high percentage of the entrained sulfur dioxide, multiple units of large scrubbing towers, typically 30 feet in diameter, are needed for adequate scrubbing treatment of this volume of gas. This enormous engineering disadvantage is overcome in one preferred practice of the present invention by first forming an aerosol in the manner hereinafter described, and then achieving rapid and substantially total absorption in the scrubbing liquor of the sulfite compounds carried in the aerosol. In this procedure, the formation of the aerosol is essentially a condensation process rather than a diffusional process, and the particles in the aerosol grow in size in transit to the scrubbing liquor.

Another advantage of the use of the aerosol formation scrubbing procedure is that there is less need to de-ash the contaminated flue gas effluent prior to charging it to the scrubbing section where aerosol formation is conjunctively effected. Yet a further advantage of the scrubbing section which incorporates and employs aerosol formation is that a portion of the existing duct work already provided for the discharge of contaminated flue gas to the atmosphere can be easily converted to, and utilized for the situs of the aerosol formation. This will generally entail the modification of existing duct work to include some other structures to extend the reaction path. This modified existing duct work may be used jointly with the aerosol former-scrubber hereinafter described. Other advantages will be pointed out in the ensuing discussions.

The aerosol which is formed can almost simultaneously be removed at the time of its formation through contact with the scrubbing liquor, and removal of the sulfur dioxide gas in the apparatus is nearly complete. Removal which is used in conjunction with the aerosol formation can be carried out using several mechanisms, such as by condensation of the aerosol induced by cooling, or by condensation induced by passing the flowing gases, including the aerosol, through a restricted flow cross-section, by impingement scrubbing or by spray scrubbing. Using any of these methods, where the aerosol formation is first effected, the conventional diffusional mechanism involved in conventional scrubbing is obviated, and the reaction rate and rate of removal of the sulfur containing gases are greatly increased so that the equipment size can be reduced by a significant extent, which can be as much as by orders of magnitude.

Ammonia is employed for formation of the aerosol (gaseous alkyl amines may also be used if cost permits). The use of ammonia, imparts a dynamic characteristic to the system important to the operation of the subsequent transfer-reduction procedure as will hereinafter be discussed in detail. In aerosol formation, certain gases or vapors react chemically with each other to form a product having a very low vapor pressure. With ammonia and sulfur dioxide, the reactions that occur are:

$$NH_3 + SO_2 + H_2O \rightarrow NH_4HSO_3 \quad (11)$$

$$2NH_3 + SO_2 + H_2O \rightarrow (NH_4)_2SO_3 \quad (12)$$

The proportions in which these two compounds are formed can be controlled by adjusting the amount of ammonia admitted to the scrubber. For complete and total removal of entrained sulfur dioxide, it is necessary, of course, that a stoichiometric amount of ammonia be present for the completion of Reactions (11) and (12). The preferred mole ratio of ammonia to the sulfur gases ($SO_2$ and $SO_3$ if some $SO_3$ is also present) is about 2. It is undesirable to exceed by any significant extent a mole ratio of 2, since use of mole ratios higher than 2 results in significant reaction between the ammonium and carbon dioxide in the flue gas, with the resultant undesirable formation of ammonium carbonate and bicarbonate.

The formation of the aerosol through this condensation mechanism depends upon the temperature and the vapor pressure of the salts formed by the reaction, and when the scrubbing solution is present, the vapor pressure of the component gases in equilibrium with the scrubbing solution. When the temperature of the gas is reduced to such an extent that the vapor pressures in the gas phase exceed that prescribed by the equilibrium conditions, condensation will occur, and the primary particles so formed will further agglomerate as they travel downstream in the moving gaseous mixture. In the system of the present invention, condensation to form solid ammonium sulfites and hydrosulfites occurs below about 140°F. The necessary cooling to achieve this status can be achieved through the evaporation of the scrubbing liquids, evaporation of liquid ammonia make-up or through external cooling. In this connection, it may be stated that additional water vapor in excess of the stoichiometric requirements of Reactions (11) and (12) is usually required for the complete and rapid removal of sulfur gas. Cooling of the liquid in the pool at the bottom of the reactor, hereinafter described, is also a means of achieving the necessary cooling.

Since the gases are molecularly dispersed, the reaction must be inter-molecular and the product when first formed is in a molecularly dispersed state. The newly formed molecules aggregate and condense to form very fine, solid primary particles at a rate which is determined by the supersaturation of the product. The formation of such an aerosol or smoke by chemical interaction between the two or more gases is essentially a condensation process. After the initial formation of the primary dispersion, the fine solid particles will grow further in size through coagulation and through a further deposition of the reaction products. As the temperature drops below the dew point in the reaction zone, water vapor will also condense on the solid particles, and as they are soluble, they will dissolve in the water droplets and eventually a mist is formed.

While the aforementioned solid particle condensation mechanism is an important aspect of aerosol formation and removal, a second mechanism which occurs concurrently is significant. In the aerosol-former-scrubbing apparatus, mist particles are created either by the spray headers or through water vapor condensation, and the sulfur dioxide entrained in the mixture of gases and to be removed is constantly being absorbed by these mist particles. Because of the very substantial surface area available for absorption on each of the mist particles, contribution of the mist to the overall removal of sulfur dioxide is considerable.

In a less preferred method of aerosol formation, a mist dispersion consisting of fine liquid particles of a solution of alkali metal hydroxide, or of an ammonium or alkali metal salt of a weak acid can be used as a removal reactant alone, and without the use of ammonia, in the development of the aerosol. In such instances, the initial aerosol formation is primarily mechanical. Thus, a dispersed mist can be generated by spray headers or other devices well known to those skilled in the art, and the $SO_2$ removal through aerosol formation made solely dependent upon absorption into the fine particles of mist. The size of the liquid particles developed in the mist is not critical, although if the size is too large, the surface area provided by these particles is relatively small and such large mist particles do not serve as a good absorption medium.

As the aerosol travels from one end of the apparatus to the other, the mist particle size may decrease or increase due to vaporization, water vapor condensation or particle agglomeration or a combination of these. Eventually, the mist particles will be removed by the scrubbing liquid situated at the bottom of the apparatus by several mechanisms hereinbefore discussed. This mode of operation of the aerosol-former-scrubbing apparatus will be discussed in detail hereinafter. The pKa ranges of the parent acid of the salt used has been hereinbefore discussed in detail, and are applicable in the case of salts used as fine airborne dispersons. In some instances, both the gaseous ammonia and a mist dispersion of a buffer salt solution can be used jointly and with synergistic effect.

Figure 2:
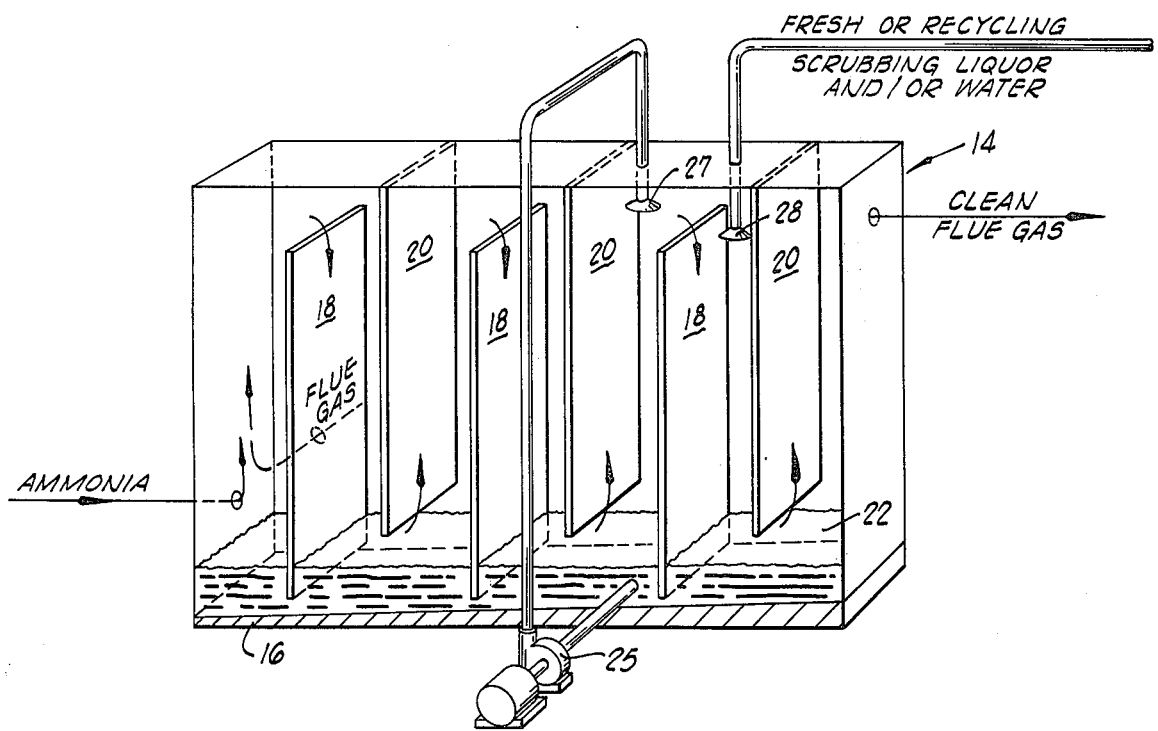
FIG. 2 is an illustration of apparatus useful in the process of the invention for concurrently forming an aerosol and scrubbing the flue gas in an essentially single step operation.

An apparatus useful in the present invention for carrying out the formation of aerosol, and the nearly simultaneous removal of the aerosol from the effluent gases by scrubbing is schematically illustrated in FIG. 2. The equipment employed can be generally described as including several components, including an enclosure having baffles installed in the path of flow of the flue gas therethrough; a liquid pool formed in the bottom of the enclosure for the purpose of impingement scrubbing; a slant floor in the bottom of the enclosure and beneath the liquid pool to induce liquid flow; a liquid pumping and spraying system; spray headers provided over the enclosure for the purpose of introducing fresh scrubbing liquor or recycled, regenerated scrubbing liquor to the enclosure and/or for introducing a water spray to the enclosure; cooling coils located within the enclosure (not shown); and restrictions in the liquid flow path to reduce the extent of backmixing. The detailed design of the apparatus is subject to many modifications to further improve the overall performance of the equipment. In FIG. 2, the enclosure is designated generally by reference numeral 14 and is a generally rectangularly shaped housing having a slant floor 16, and having positioned therein a plurality of baffles, with baffles 18 projecting upwardly from the slant floor and alternate baffles 20 suspended from the roof or ceiling of the housing and projecting into close proximity to a liquid pool 22 located in the bottom of the enclosure 14.

In the apparatus depicted in FIG. 2, the contaminated flue gas or effluent gas enters through an appropriate conduit at one end of the enclosure 14 and is mixed at that point with ammonia gas and water vapor passing into the housing in that proximity. Contact of the gases results in the formation of the aerosol, and ultimately in the formation of a mist having a solid completely dissolved therein or having solid particles entrained in fine surrounding globules of water. As the aerosol gas passes under the lower edge of every alternate baffle 20, it impinges upon the liquid pool at the bottom of the unit and the aerosol is removed by this impingement action. The degree of impingement varies with the baffle clearance provided. With no clearance, the aerosol and gas stream must flow beneath the liquid surface to pass the baffle, and the impingement action is maximized, but the pressure drop also increases. Clearance afforded can be easily adjusted by the adjustment of the liquid level, as well as by vertical adjustment of the baffles 20 themselves. Moreover, the details of the openings or slots through which the gas passes can be differently designed from that which is shown.

As an additional scrubbing mechanism, liquid withdrawn from the liquid pool 22 in the bottom of the reactor by the pump 25 and recycled through the spray header 27 is effective to further scrub aerosol moving upwardly countercurrently to the downwardly cascading scrubbing solution. The number of spray headers 27 which are employed in the system can be varied according to need. It is also within the contemplation of the invention to provide the liquid pool 22 in either a single compartment or in multiple compartments.

The purpose of the slant floor 16 is to induce the desired liquid movement which generally is maintained countercurrent to the gas flow. Moreover, as the gas flows under the lower edges of the baffles 20, its flow rate increases as a result of decreasing cross-section of the flow path and therefore the pressure decreases. If the gas moving through this reduced pressure region is fully saturated, condensation will occur in the particles when they flow out of that region as the pressure is recovered. This aids the growth of aerosol particles which are not removed by the impingement scrubbing action. The degree of this type of induced condensation can be regulated by the internal design of this low pressure region. It will be perceived that at the discharge or emission end of the system depicted in FIG. 2, the cleaned effluent flue gas is here in contact with the relatively dilute fresh scrubbing liquor, and this makes nearly 100 percent removal possible. The scrubbing liquor, which can be either freshly produced or may be regenerated scrubbing liquor derived from other sections of the system (e.g., the recovery section) can be introduced to the enclosure in various ways, such as through one or more spray headers 28. These spray headers 28 can also be used at various times to introduce fresh, make-up water to the enclosure. At its other end, the scrubbing liquor in contact with the entering flue gas is maintained at a relatively high concentration which facilitates its subsequent recovery. Since the liquid moves at a relatively slow rate from one end of the enclosure 14 to the other, the prevailing concentration gradient from one end of the liquid pool 22 to the other can be maintained high.

The described apparatus for aerosol formation and substantially concurrent scrubbing can tolerate relatively high ash or dust loads in the flue gas stream. Therefore, complete de-ashing or de-dusting of the contaminated flue gas charged to the apparatus is not necessary. The unit has many additional advantages. Thus, removal of entrained sulfur dioxide is substantially quantitative, and is accomplished at a very high rate of removal. The residence times involved are generally no more than several seconds. Because of these short residence times, the undesirable oxidation of sulfite compounds to sulfates is minimized, as is the undesirable formation of carbonate compounds by reaction with carbon dioxide present in the effluent stack gas.

In one mode of utilization of the aerosol-former-scrubbing apparatus of the present invention, a mist dispersion of an alkali metal or ammonium salt in water is utilized, instead of ammonia, for effecting removal of the $SO_2$. The bottom pool of the aerosol-former-scrubbing apparatus is preferably divided into several compartments when the salt mist aerosol development technique is used. The salt solution is admitted through a spray header to the first compartment and moves downwardly and accumulates at the bottom pool. The liquid from the bottom pool of the first compartment is then pumped to the spray header in the second compartment and this operation is repeated to the upstream end of the apparatus where the untreated flue gas is admitted. The mist particle size of the dispersion from the spray header in the first compartment is relatively large, and the operation occurring here is essentially a spray scrubbing operation. In contrast, the particle size of the dispersion from the spray header in the last (most upstream) compartment is quite small, and in this compartment the mechanism occurring is essentially that of initial aerosol formation.

Between the first and last compartments in the aerosol-former-scrubbing apparatus, the size of the dispersion particles is gradually varied from a relatively large size to the relatively fine or small size characteristic of the last or most upstream compartment. In this manner, the net flow of the scrubbing liquid is countercurrent to the flow of gas, and concentrated spent scrubbing liquor will be produced at the gas entering end. If, for instance, sodium monohydrogen phosphate solution is employed as the removal reactant, the absorption reaction occurs in accordance with Reaction (9), and the spent scrubbing liquor consists essentially of sodium hydrosulfite and sodium dihydrogen phosphate. The sodium monohydrogen phosphate removal reactant can be readily regenerated with the concurrent production of elemental sulfur as will be described in detail hereinafter.

THE TRANSFER — REDUCTION STEPS

When sulfur dioxide is removed from a gaseous mixture, sulfite and hydrosulfite salts are produced in the scrubbing step of the present invention. If elemental sulfur is to be derived as an easily disposed of end product of the process, subsequent processing must deal with reduction, through one or more steps, of these salts present in the spent scrubbing liquor. Direct reduction of this spent aqueous scrubbing liquor is a difficult task. I have discovered that such reduction can, however, be quickly and easily effected indirectly with several ancillary advantages accruing from such indirect reduction. In the indirect reduction, the cations of the removal reactant in the spent scrubbing liquor are first replaced by certain alkyl ammonium ions or quaternary ammonium ions whereby the sulfite ions are transferred from the water phase to an organic phase in which the large organic cation-containing product is soluble, and the organosulfite compounds are here (in the organic phase) subsequently reduced by hydrogen sulfide.

Before discussing the phase transfer-reduction procedure utilized in the present invention, it may be commented that in those prior art methods in which the scrubbing liquor is regenerated thermally, steam consumption used for providing the necessary heat is usually high, and sulfur dioxide gas is evolved from the scrubbing liquor and must be disposed of. The advantage in such instance is merely that the $SO_2$ removed from the stack gas is placed in a more concentrated and easily handled form than in the minute quantities in which it is otherwise undesirably vented to the atmosphere in the stack gas. Those techniques which undertake to directly regenerate the scrubbing solution by chemical means, as by direct reduction using common reducing agents such as hydrogen sulfide, hydrogen or carbon monoxide, either require severe operating conditions in which undesirable sulfate compounds are formed in an unacceptable amount, or the aqueous solution needs to be placed in an acidic pH region (pH below about 4 or 5) such that the selection of scrubbing compound is severely limited. Furthermore, if the scrubbing composition is required to operate in a relatively acidic region during the scrubbing step, the removal capacity of the scrubbing liquor becomes very limited so as to seriously affect the overall operating efficiency of the scrubbing process. A basic desideratum which has existed previously therefore, and which has led to the development of the present invention, is to find a method generally applicable for regeneration of the most useful scrubbing liquors, and for disposal of the sulfur compounds present therein in an ultimately formed, valuable and easily transported product, with minimum utility cost, and little generation of waste material.

I have discovered that very rapid regeneration of the scrubbing liquor, with quick and highly efficient conversion of the sulfite compounds therefrom to solid sulfur as a product, can be accomplished by using a two step procedure in which, in the first step, the cation of the sulfite and hydrosulfite compounds in the spent scrubbing liquor is replaced by a long chain alkyl ammonium ion, or a long chain quaternary ammonium ion, and the sulfite ion is simultaneously transferred from the aqueous phase to an organic phase. This initial step is then followed, or can actually proceed concurrently with, the reduction, by contact with hydrogen sulfide, of the organo-sulfites and hydrosulfites thus formed. The reasons that the sulfite ions are so readily reducible in the organic soluble organo-sulfite salt form is not precisely known. It is conceivable that the reduction of the organosulfites involves more favorable intermediate steps when carried out in the organic phase than can be realized in the reduction of such sulfite compounds when dissolved in an aqueous solution. As pointed out above, reductions of this general type, when attempted previously, have been carried out in a relatively low pH, generally acidic solution. Yet I have found, surprisingly, that the elemental sulfur precipitates out readily from an organo-sulfite containing organic phase having a pH value as high as about 7.

The effective transfer reactants utilized to react with the sulfites and hydrosulfites in the spent scrubbing liquor are substantially water immiscible organic bases and salts containing a nitrogen atom and having from one to four alkyl substituents. Comprehended by this broad definition of the transfer reactants useful in the invention are substantially water immiscible primary, secondary and tertiary alkyl amines and quaternary ammonium bases, and the water immiscible salts of these basic compounds. A typical solubility value useful as a guide to the selection of water immiscible amines is about 0.2 gm/100 gm water at 25°C (i.e., the free amine transfer reactant should have a water solubility of less than about 0.2 gm/100 gm water). Water immiscibility is necessary so that the regenerated scrubbing liquor from the transfer-reduction procedure can be separated directly from the organic phase and recycled to the scrubber.

High water solubility indicates that higher leakage of the amine transfer reactant into the water phase will occur, or such leakage will occur to the regenerated aqueous scrubbing liquor. When free amine is used as the transfer reactant, most of the occurrent leakage will result due to the leakage of the amine salts which are formed from the amine during the transfer reaction, since the salts are generally more soluble than their parent free amine base. The indicated criterion of immiscibility for purposes of transfer reactant selection of about 0.2 gm/100 gm water at 25°C refers to the free amine. Generally, such water immiscible amines will have alkyl substituents containing at least 12 carbon atoms. In the case of some highly branched alkyl amines (e.g., highly branched tertiary alkyl primary amine), however, the alkyl groups may have as few as 8 carbon atoms and still exhibit sufficient water immiscibility. 1–4 dimethyl pentylamine, a $C_7$ alkyl amine has a water solubility below 0.2 gm/100 gms water and can also be used at least in admixture with amines having 8 or more carbon atoms.

Commercially available long chain alkyl amines are usually furnished as a mixture of amines of various alkyl chain lengths. When such a mixture is used, amines of higher solubility are more tolerable when such amines constitute only a minor fraction of the total mixture. Moreover, although short chain alkyl amines having solubilities which exceed 0.2 gm/100 gm water at 25°C are considered undesirable under normal circumstances because of their high leakage loss, these amines nevertheless have generally higher basicity than long chain alkyl amines, and in some instances, the addition of small amounts of such amines to the solvent system is advantageous as will be discussed in greater detail hereinafter.

When an amine salt is used as the transfer reactant, its water solubility should not exceed about 5 gms per 100 gms of water at 25°C. Such amine salts are generally derivable from free amines having the degree of immiscibility prescribed above. The same solubility limit is applicable to free quaternary ammonium base or the salts thereof when used as the transfer reactant (i.e., 5 gm/100 gm water at 25°C). A number of quaternary compounds which have alkyl substituents containing at least 24 carbon atoms meet the water immiscibility criteria prescribed. In the case of any transfer reactant, it preferably does not contain more than 45 carbon atoms in the several alkyl substituents.

Another characteristic which must inhere in the transfer reactant is that such compound must not form a stable emulsion with the aqueous solution. Thus, for example, difatty quaternary ammonium compounds having two long alkyl groups each of which contains about 18 carbon atoms, although water insoluble, disperse into the water layer and form a stable emulsion, rendering phase separation extremely difficult.

The transfer reactant must be an organic soluble compound, or itself be a liquid capable of providing a distinct organic phase when contacted with the spent aqueous scrubbing liquor. The "alkyl substituents" of the nitrogen atoms in the transfer reactants as here defined can be straight chain or branched, and can be substituted in varying degree with substituents and functional groups which are chemically inert with respect to the reactants and solvents encountered in the transfer and reduction reactions as long as such substitution does not materially lower the transfer capacity (or G value) of the parent transfer reactant before substitution. Amines with unsubstituted alkyl chains generally perform better than amines with substituted alkyl groups, and are therefore normally preferred.

Other desirable properties of the transfer reactants used in the invention, and encompassed by the relatively broad identification set forth above, will be hereinafter described.

THE GENERAL MECHANISM OF THE TRANSFER REACTION

When the spent scrubbing liquor is essentially an aqueous hydrosulfite solution, and when a long chain alkyl primary amine is used as the transfer reactant, the transfer reaction may be written as $$2MHSO_3(aq.) + 2RNH_2(org.) \rightarrow (RNH_3)_2SO_3(org.) + M_2SO_3(aq.) \quad (13)$$

where $M$ denotes a cation (e.g., $Na^+$), $R$ denotes an alkyl radical, and (aq.) and (org.) denote aqueous phase and organic phase, respectively. It is generally desirable, although not always necessary, to dissolve the water immiscible primary amine in a water immiscible organic solvent, such as kerosene. As the amine sulfite salt formed is water insoluble, but organic soluble, the net result of this reaction is a transfer of the sulfite ion from the aqueous phase to the organic phase. The normal sulfite regenerated in the aqueous phase according to reaction (13) is then suitable for recycling and further scrubbing use.

I have found that when excess hydrosulfite is present, a greater amount of sulfite (i.e., over 50%) can be transferred to the organic phase by the reaction, $$2MHSO_3(aq.) + (RNH_3)_2SO_3(org.) \rightarrow 2(RNH_3)HSO_3(org.) + M_2SO_3(aq.) \quad (14)$$

Both reactions (13) and (14), which are liquid ion exchange reactions, occur at very rapid rates. The extent of each reaction depends on the hydrosulfite concentration in the aqueous phase, the amine to sulfite molar ratio and the "transfer capability" of the particular amine in use. The "transfer capability" of amine is significantly related to the basicity of the amine, and both will be discussed in detail hereinafter.

When the spent scrubbing liquor is an aqueous solution of a normal sulfite, the corresponding transfer reaction may be written as $$M_2SO_3(aq.) + 2RNH_2(org.) + 2H_2O(aq.) \rightarrow (RNH_3)_2SO_3(org.) + 2MOH \quad (15)$$

Reaction (15) is also a "liquid ion exchange" reaction, but it has previously been thought by chemists that the alkyl amines, being weak bases, would not react with a normal sulfite salt according to this reaction. Notwithstanding the fact that Reaction (15) does not occur to any significant extent in a "liquid ion exchange" sense, this reaction does proceed extensively in the transfer-reduction procedure. That is because the transfer reaction of the present invention has several dynamic aspects which will be discussed in greater detail hereinafter. Additionally, it should also be noted that ion exchange reactions using alkyl amines are usually carried out in a much more acidic environment (e.g., pH = 3) than that which is prevalent in my transfer reaction system (e.g., pH = 7).

When a quaternary ammonium base which has a higer basicity than amine, is used instead of amine in Reaction (15), the transfer reaction will proceed as written, even in a "liquid ion exchange" sense. In some instances, the use of such highly alkaline base is desirable.

Water immiscible long chain alkyl amine salts as well as water immiscible quaternary ammonium salts can also be used as transfer reactants. The transfer reaction may then be typically written as, with bisulfite salts:

$$MHSO_3(aq.) + RNH_3A(org.) \rightarrow RNH_3HSO_3(org.) + MA(aq.) \quad (16)$$

$$MHSO_3(aq.) + 2RNH_3A(org.) \rightarrow (RNH_3)_2SO_3(org.) + MA(aq.) + HA(aq.) \quad (17)$$

and with normal sulfite salts:

$$M_2SO_3(aq.) + 2RNH_3A(org.) \rightarrow (RNH_3)_2SO_3(org.) + 2MA(aq.) \quad (18)$$

where A is an anion. In most instances, it is advantageous to use the same anion as the anion of the removal reactant.

REDUCTION REACTION

In the reduction reaction employed in the present invention to produce elemental sulfur by hydrogen sulfide, the precise reaction mechanism is not known. The overall reactions can be represented as, $$(RNH_3)_2SO_3 + 2H_2S \rightarrow 2RNH_2 + 3H_2O + 3S \qquad (19)$$

$$RNH_3HSO_3 + 2H_2S \rightarrow RNH_2 + 3H_2O + 3S \qquad (20)$$

The reactions are believed to probably occur through the formation of amine sulfides as follows:

$$H_2S + 2RNH_2 \rightarrow (RNH_3)_2S \qquad (21)$$

$$(RNH_3)_2SO_3 + 2(RNH_3)_2S \rightarrow 6RNH_2 + 3H_2O + 3S \qquad (22)$$

$$RNH_3HSO_3 + 2(RNH_3)_2S \rightarrow 5RNH_2 + 3H_2O + 3S \qquad (23)$$

Some thiosulfate was found to be present in the reaction liquor, probably by the reaction $$(RNH_3)_2SO_3 + S \rightarrow (RNH_3)_2S_2O_3 \qquad (24)$$

The presence of such thiosulfate intermediate, as well as some polysulfides, does not interfere wth the overall course of the transfer and reduction steps, since thiosulfate and polysulfides are not stable and will subsequently further convert to elemental sulfur.

It was pointed out above that the transfer reaction species represented by Reaction (15), and involving a normal sulfite salt does, surprisingly, occur extensively when used in the process of the present invention. It was further mentioned that such occurrence is attributed to several dynamic aspects of the transfer-reduction reaction systems, as contrasted to the normally static character of this type of ion exchange reaction as it has been previously carried out in an aqueous, acidic environment. The first dynamic aspect of the transfer reaction arises through the formation of amine sulfide according to Reaction (21) which occurs at a time when the transfer reaction and the reduction reaction are carried out concurrently in a common zone. Although, as stated in referring to Reaction (15), amine in its free base form does not, absent the dynamic considerations here being discussed, efficiently transfer sulfite ion into the organic phase as a result of the progression of Reaction (15), the amine sulfides formed by Reaction (21) will, nevertheless, through Reaction (18) (where A now represents one equivalent of sulfide ion), effectively accomplish such transfer in a relatively efficient manner. High $H_2S$ pressure aids in forcing the reactions toward completion.

A second dynamic aspect of the transfer reaction also acts to force Reaction (15) to the right when the transfer and reduction reactions are carried out concurrently. This dynamic aspect arises because the reduction reaction is continuously removing the transfer reaction product (i.e., amine sulfite salt) by conversion to elemental sulfur, thus providing an enhanced impetus for the transfer reaction to proceed to completion.

Yet another dynamic influencing progression of the transfer reaction toward completion is experienced when ammonia gas or ammonium hydroxide is used as the removal reactant, and ammonium sulfite compounds are present in the spent scrubbing liquor. The dynamic driving force here occurs essentially because of the high volatility of the ammonia. Referring back to Reaction (15), if M there denotes ammonium, one of the reaction products will then be ammonium hydroxide, and the reaction can be made to progress toward the right as ammonia is continuously stripped from the transfer reaction zone. In a preferred embodiment of the invention, such ammonia stripping is in fact practiced, and substantially all of the water in which the ammonia is dissolved as ammonium hydroxide is also removed during this stripping operation.

These dynamic forces, acting either individually or in concert, help to bring the transfer-reduction reactions to proceed toward completion. This is true even where the transfer reactant chosen has relatively low transfer capability or capacity, i.e., statically transfers only a relatively small amount of the hydrosulfite ion in the scrubbing liquor into the organic phase upon contact with the spent scrubbing solution. It is, nevertheless, better to use transfer reactants having a relatively high transfer capability.

In order to consider in greater detail the transfer capability characteristic of transfer reactants useful in the present invention, a parameter referred to as "G value", and hereinafter defined, can be advantageously employed as a measure of transfer capability. Though the discussed dynamic aspects of the transfer-reduction procedure renders the selection of a particular transfer reactant for high transfer capability less critical, it is nevertheless preferred to use a transfer reactant having a high "G value", and thus performing with relatively high efficiency in effecting the transfer of sulfite anions from the salts present in the aqueous scrubbing solution to organo-sulfite compounds of the type hereinbefore described.

In general, any organo nitrogen compound with a characteristic basic functional group of the type $-NH_2$, $>NH$, $>N-$ and

displays some "transfer capability" for hydrosulfite anions statically and sulfite anions dynamically. The "transfer capability" can be defined in several ways, such as in terms of the distribution of sulfite ions as between the organic and aqueous phases present in the transfer reaction system. A more suitable mode of defining the "transfer capability" of the transfer reactant, however, is in terms of a "G value", which is defined as, $$G = \frac{\text{Equivalents of reducible sulfur in a kerosene base organic phase}}{\text{Total moles of amine or quat ammonium base in kerosene}} \qquad (25)$$

It will be seen in referring to Equation (25) that the G value is an expression of the efficiency of transfer of sulfite ions from the aqueous to the organic phase, based upon the degree to which all of the moles of amine or quaternary ammonium base cations present in the organic phase have become bonded to anions containing reducible sulfur. It will further be apparent that where the product of the ion transfer is amine sulfite, the maximum G value obtainable is 0.5, and where the product is amine hydrosulfide, the maximum G value is 1.0. The transfer capability of a particular transfer compound can therefore be judged by the way in which its G value relates to these maximum G values which are attainable in reactions which yield amine sulfite and amine hydrosulfite, respectively. Because the kerosene organic solvent is a relatively inexpensive one which works well in carrying out the transfer reaction, it has been used as the basis for computing the G value for practical reasons. It should be pointed out, however, that G values can be calculated in reference to other solvents equally expediently.

The numerical magnitude of the G value depends upon the initial hydrosulfite concentration in the aqueous phase and the initial amine concentration in the organic phase in a static transfer experiment. When these conditions are kept constant, the G value adequately measures the effectiveness of an amine in effecting the hydrosulfite transfer. It also serves as an index of the effectiveness of the amine in effecting sulfite transfer under dynamic conditions. For this purpose, the G value can be conveniently determined as follows: 10 ml of an aqueous solution containing 3.37 mmols of sodium hydrosulfite per ml is shaken with 16.85 mmols of the long chain amine or quaternary ammonium base dissolved in an equal volume of kerosene in a separatory funnel for a period of five minutes. The two layers are allowed to separate, and the sulfite content of the organic layer is determined. The G value can then be calculated according to Equation (25). Where an amine salt or a quaternary ammonium salt is utilized, an amount of the salt is placed in the kerosene which will provide the equivalent of the 16.85 mmol amine or quaternary amine base.

The selection and use of a transfer reactant having a relatively high G value affords at least two practical advantages in the practice of the present invention. First, a high transfer per pass (during the cyclic operation of the process) corresponds to a reduced volumetric recirculation need for the regenerated transfer reactant and its solvent (if one is used) in the operation of the process. The significance of this practical advantage becomes more apparent when it is considered that in the case of transfer reactants having long chain alkyl substituents, the recirculation of the large molecule transfer reactants entails a relatively high cost of recirculation in relation to the chemical activity of each molecule of the transfer reactant employed. A second advantage of the employment of a high G value transfer reactant is that the sulfur produced by the reduction reaction is yielded in a more easily handled form. The fine sulfur particles must be coalesced before the sulfur product can be precipitated out in an easily handled form. When the transfer efficiency experienced in the transfer reaction is increased by the use of a high G value transfer reactant, the sulfur particles are found to be more densely populated, and coalescence and precipitation of the solid sulfur product is significantly enhanced.

In reference to the characteristic G values of those transfer reactants which can be used to advantage in the process of the present reaction, I prefer to employ transfer reactants having a G value exceeding 0.15. Above this minimum G value, more suitable results are obtained in the case of alkyl amine free base and quaternary ammonium free base type reactants where the G value is higher than 0.2 and the best results with these types of compounds are achieved if such transfer reactant has a G value exceeding about 0.4. Alkyl amines are commercially available having G values higher than 0.5, and when these compounds are employed as transfer reactants, the sulfur precipitates out in coarse granular form expediently after the organic phase is subjected to contact with hydrogen sulfide. When transfer reactants having a relatively low G value of less than about 0.15 are used, the coalescense of sulfur particles takes a substantially longer time, but may be accelerated by the use of techniques, such as ultrasonic vibration, which are conventional for this purpose in the field of colloidal chemistry. In the case of the salts of alkyl amines and of quaternary ammonium bases, these types of transfer reactants appear to generally effect relatively good results at G values in excess of about 0.3.

In the selection of a transfer reactant for carrying out the transfer step of the present invention, basicity of the reactant (which is closely related to the G value), and solubility of such reactant in the organic phase, are significant considerations where the transfer reactant is to be dissolved in, and recirculated with, an organic solvent. With respect to basicity of long chain alkyl amines, the basicity generally decreases according to increased substitution by alkyl groups of the nitrogen atom, i.e., primary amines > secondary amines > tertiary amines. Branching of the alkyl substituents tends to decrease the basicity of the amine to some degree, but it also improves the solubility of such transfer reactants in organic solvents of the types hereinafter described. It may be further noted that the free amine and quaternary ammonium bases exhibit better solubility in organic solvents than their salts. Considering basicity and organic solubility together, tertiary alkyl primary amines are those which afford the best results and therefore constitute the most preferred transfer reactants.

When the basicity and the water solubility of the transfer reactant are considered together, the addition of some relatively low molecular weight, and therefore more water soluble alkyl amines (e.g., $C_7$ or $C_6$ alkyl amines), to the water immiscible solvent systems is occasionally beneficial. For instance, in an ammonium base system where ammonium ions are replaced by the alkyl ammonium ions in the transfer reaction step, and ammonia gas is released, the more basic short chain amines facilitate such replacement, although water leakage loss is simultaneously increased. The system of the present invention is a closed system, and water leakage is subject to some control as will be hereinafter discussed.

In further relation to organic solubility, as such must be considered where the preferred mode of carrying out the present invention is in use and the transfer reactant is dissolved and recirculated in a suitable organic solvent, it may be noted that the organic solubility of the transfer reactants of the type described can be improved by adding to the organic solvent, as a transfer reactant solubility promoter, from about 3 to about 5 weight percent of a long chain alkanol (containing, for example, from about 12 to about 24 carbon atoms).

Within the broad defining range of chain length and water immiscibility characteristics hereinbefore set forth, it is preferred to use alkyl amines and quaternary ammonium bases having a molecular weight in the range of from about 180 to about 650, and salts derived therefrom.

There are a number of amines which satisfy the broad criteria above described, as well as the desiderata employed in the selection and use of preferred or most suitable amines and salts as set forth above. A partial listing of commercially available alkyl amine free bases which perform well includes: an isomeric mixture of tertiary alkyl primary amines each having a chain length in the $C_{18}$–$C_{22}$ range and sold under the tradename Primene JMT; an isomeric mixture of tertiary alkyl primary amines each having a chain in length in the $C_{12}$–$C_{14}$ range and sole under the tradename Primene 81R; a mixture of N-dodecenyl-N-trialkylmethyl amines each containing from 24 to 27 carbon atoms and sold under the tradename Amberlite LA-1; a mixture of N-lauryl-N-trialkylmethyl amines each containing from 24 to 27 carbon atoms and sold under the tradename Amberlite LA-2 (all the foregoing are marketed by the Rohm & Haas Company of Philadelphia, Pennsylvania); methyl di-(n-octyl) amine and 1-(3-ethylpentyl)-4-ethyloctyl amine.

A useful quaternary ammonium base transfer reactant which can be used is derivable from a mixture of trialkylmethyl ammonium chloride compounds, in which the alkyl substituents are straight chain alkyl groups containing from 8 to 10 carbon atoms. This chloride composition is sold commercially under the tradename Aliquat 336 by General Mills Chemicals, Inc. of Minneapolis, Minnesota.

As previously indicated, it is preferred to place the transfer reactant in an organic solvent for carrying out the transfer reaction, even though many liquid amines can be employed without such solvent, and themselves constitute the organic phase used in the transfer and reduction reactions. Solution in an organic solvent improves the flow characteristics of the amine, decreases its occlusion loss during the sulfur precipitation and increases the speed of phase disengagement. Organic solvents which can be effectively employed include water immiscible alcohols, ketones, ethers, esters and hydrocarbons such as benzene, toluene, xylene, kerosene, heavy naphtha and light gas oil. Solvents which form a hydrogen bond with hydrogen sulfide afford the additional advantage of holding the gaseous hydrogen sulfide in the liquid reaction medium. The solvent selected and used should preferably be nontoxic, of relatively low volatility, substantially water insoluble and chemically inert toward the reactants and any other solvents in the zones in which the transfer and reduction reactions are carried out. Kerosene boiling in the range of from about 350° to about 600°F is the preferred solvent.

THE INTERRELATIONSHIP OF THE SCRUBBING STEP AND THE TRANSFER AND REDUCTION STEPS

The initial scrubbing step, and the following transfer and reduction reactions have thus far been discussed separately. Their interrelationship, however, is important to know and understand in order to effectively choose the best scrubbing or removal reactants. When an alkali metal salt of a weak acid is employed as the removal reactant, the occurrent scrubbing reactions are:

$$NaA + SO_2 + H_2O \rightarrow NaHSO_3 + HA \tag{26}$$

$$Na_2A + SO_2 + H_2O \rightarrow NaHSO_3 + NaHA \tag{27}$$

Thus, either an acid, HA, or an acid salt, NaHA, is generated, depending on whether the anion A is monovalent or multivalent. In the subsequently carried out transfer reaction, sodium hydrosulfite produced by both Reactions (26) and (27) will be converted to sodium normal sulfite according to Reactions (13) and (14). Although a mixture of sodium normal sufite and HA nor NaHA can be used as a recycled scrubbing solution, its scrubbing and $SO_2$ removal capacity is increased significantly if the protons from HA or NaHA are removed during the regeneration of the scrubbing reactant in the course of the transfer and reduction reactions. This is achieved, either by interaction with amines by the reactions, $$HA(aq) + RNH_2(org) \rightarrow RNH_3A(org) \tag{28}$$

$$2NaHA(aq) + 2RNH_2(org) \rightarrow Na_2A(aq) + (RNH_3)_2A(org) \tag{29}$$

or by disproportion with normal sulfite produced in Reactions (13) and (14), followed by a subsequent conversion of the resulting hydrosulfite to elemental sulfur by the transfer and reduction reactions as hereinbefore described, $$Na_2SO_3 + HA \rightarrow NaHSO_3 + NaA \tag{30}$$

$$Na_2SO_3 + NaHA \rightarrow NaHSO_3 + Na_2A \tag{31}$$

The extent to which Reactions (28)–(31) are completed depends upon the pKa values of the acid HA. When the pKa is 10.0, the extent of completion of disproportion Reactions (30) and (31), when expressed as the molar ratio of $HSO_3^-/SO_3^=$, is about 0.05 and represents adequate yield of the intermediate species $HSO_3^-$ to cause substantial conversion of HA or NaHA to the normal salt $Na_2A$ through the disporportion - transfer-reduction route. When the pKa value is 8.0, the corresponding molar ratio is about 0.4 and converstion through the disproportion route is much expedited. Reactions (28) and (29) also proceed significantly when the described pKa values are characteristic of the partent acid of the reactants NaHA and HA. These considerations, together with the lower limits of pKa as hereinbefore discussed, demonstrate that it is of advantage to select, as scrubbing reactants, salts derived from weak acids having a pKa value in the range of from about 5 to about 10, and more preferably, from about 7 to about 8. The preferred salts thus, as previously indicated, include sodium sulfite and sodium monohydrogen phosphate derived from the corresponding parent acids $HSO_3^-$, and $H_2PO_4^-$, respectively.

FIG. 1 of the drawings depicts one embodiment of my invention which is particularly suitable for small source applications — that is, instances where $SO_2$ is to be removed from a relatively small total quantity of stack gas or other gaseous mixture. Sodium sulfite will be used by way of example as the removal reactant referred to in the following discussion. Other salt buffered systems discussed in detail earlier in the application can be used as well.

As effluent gas from which the sulfur dioxide gas is to be removed is passed into a conventional scrubber 10 where it is scrubbed with a sodium sulfite scrubbing liquor. The scrubbing liquor is admitted through a spray header 12 in the top of the column, and passes downwardly in the column in countercurrent fashion with respect to the rising flue gas. The scrubbing column usually has several scrubbing stages. Within the scrubber column 10, Reaction (8) occurs yielding sodium hydrosulfite.

Upon formation of the hydrosulfite compound in the scrubbing liquor, the spent scrubbing liquor is accumulated in the bottom of the column 10 and is removed by a pump 14, and a major portion thereof is recycled to the top of the scrubbing column. A portion of the spent scrubbing liquor, however, is sent through a slip stream 15 tp the top of the transfer reaction column 30. An organic solvent carrying, for example, a long chain alkyl amine is admitted to the bottom of the transfer reaction column. The transfer reaction column 30 may have a single stage or several reaction stages. In the transfer reaction column, the alkyl amine which flows upwardly in countercurrent flow to the spent scrubbing liquor reacts with the hydrosulfite compound in the scrubbing liquor, and there are formed alkyl amine sulfite salts which are preferentially dissolved in the organic solvent. The organo-sulfite organic solution is discharged from the top of the column 30. The regenerated sodium sulfite remains in the water phase in the lower portion of the column 30 and is withdrawn by means of a suitable pump 32 and recirculated through conduit 33 to the top of the scrubber column 10. Make-up water can be added to the conduit 33 as needed.

The organic solvent carrying the dissolved amine sulfite is withdrawn from the column 30 by a pump 48 and is directed through a conduit 49 to the reduction section 44 of the reduction reaction column 40. In the reduction column 40, there is included an absorption section 42 in the upper portion of the column where the unreacted hydrogen sulfide gas is absorbed by a recirculating stream of the amine bearing solvent introduced through conduit 43. The unreacted hydrogen sulfide gas moves upwardly in the absorption section 42 in counter-current flow to the downwardly gravitating organic solution which, upon leaving the absorption section 42, enters directly into the lower reduction reaction section 44.

As indicated, only the organic layer from the transfer reaction column 30 is sent to the reduction column 40 in which the dissolved amine sulfite is reduced by reaction with hydrogen sulfide to elemental sulfur. The hydrogen sulfide is admitted via a conduit 51 to the bottom section 44 of the column 40 beneath the liquid level. A small, controlled amount of water (e.g., 1 to 5 volume percent, based on the total volume of the organic solution) is beneficially present to serve as a reduction catalyst. A small amount of a detergent (e.g., aralkyl sulfonate — 0.1 to 1.0 weight percent, based on the total weight of the organic solution) aids in dispersing the catalytic water in the organic phase. Stirring may be beneficially employed to further aid such dispersion. A small amount (e.g., 3 to 5 weight percent of the total weight percent of the organic solution) of a long chain water immiscible alcohol (e.g., $C_{12}$–$C_{24}$ alkanol) can be usefully included in the organic solution as a modifier, and an aid to retention in solution of the amine compounds.

In the reduction section 44, sulfur precipitates out in granular form, and the organic phase becomes a moderately thick slurry. The slurry is, however, pumpable and the slurry is removed from the bottom of the column 40 and passed to a centrifuge 46 or other separatory device. A portion of the amine bearing liquid discharged from the centrifuge upon separation therefrom of the solid sulfur is recycled by a suitable pump 34 to the transfer column 30. Another portion of the amine bearing organic solvent is recycled to the top of the reduction reaction column 40 through a conduit 43 to absorb unreacted hydrogen sulfide as hereinbefore described. Make-up organic solvent can be added to the stream entering the column 30 from the pump 34. The gas emitted from the top of the reduction column 40 is essentially carbon dioxide, with a small amount of contamination of hydrogen sulfide and methane. The concentrations of these latter gases are so low that the effluent gas can be directly discharged to the atmosphere. Optionally, it may be admitted to the combustion chamber of a boiler, and thus burn all of the minor components to carbon dioxide, water and sulfur dioxide which simultaneously become a part of the untreated flue gas.

Optionally used in conjunction with the reduction column 40 is an independent hydrogen sulfide absorption loop wherein a long chain alkyl amine is continuously recirculated downwardly inside the absorption section 42 of the column 40, in which section the unreacted hydrogen sulfide gas is absorbed. The pregnant absorption liquor used in the absorption loop will, in this instance, accumulate in a sump (instead of entering directly to the lower reduction section 44 as previously described herein), from which sump it is withdrawn. The withdrawn absorption medium, after passing through a heat exchanger 54, is further heated in a heat tank 56 wherein all of the hydrogen sulfide is stripped out of the absorption medium. The hydrogen sulfide from the heat tank 56 is then passed back into the main hydrogen sulfide supply conduit 51 via a conduit 57, and the regenerated long chain alkyl amine absorption medium is pumped back to the top of the absorption section 42 of the column 40 by a suitable pump 58 after it has been cooled by passage through the heat exchanger 54. additional external heating may be applied if needed. When the optional independent absorption loop is used for absorbing the unreacted hydrogen sulfide, all of the organic solvent carrying the transfer reactant in solution is sent to the transfer reaction column 30, and the side stream previously sent to the top of the reduction column 40 via the conduit 43 is eliminated.

When a long chain alkyl amine is employed as the transfer reactant, the same amine is normally used in the independent hydrogen sulfide absorption loop because the material handling aspects of the overall process are thereby simplified. However, amines different from the transfer reactant may be used in the independent absorption loop. The amine used need not be water immiscible as is characteristic of the transfer reactant, and in special cases, the use of an aqueous amine solution can even be advantageous. In fact, the medium used for absorption of the hydrogen sulfide and recirculated in the absorption loop need not be an amine at all, since any absorbant medium capable of absorbing hydrogen sulfide and undergoing regeneration in the manner described can be used in this independent and optionally employed loop.

For the purpose of providing the hydrogen sulfide gas employed in the reduction of the organo-sulfites in the reduction zone 44 of the column 40, a portion of the solid sulfur product from the centrifuge 46 is directed to a conventional catalytic reactor 50. The catalytic reactor 50 can be operated in a single stage or in two separate stages, and uses about ⅔ of the total sulfur product for conventional reaction with methane and steam to yield hydrogen sulfide in admixture with some carbon dioxide.

Both the transfer reaction column 30 and the reduction column 40 can be operated at near room temperature. The reduction occurring in the reduction column 40 generates some heat which can be conveniently removed by water cooling (not shown) the recirculating solvent stream. Although room temperature operation is preferred, since low temperature precludes a number of undesirable side reactions leading to the formation of sulfate, higher temperatures can be employed as long as the thermal stability of the transfer reactant and the products of the transfer reaction, as well as their chemical stability toward hydrogen sulfide and sulfur dioxide, do not cause them to deteriorate and thus entail excessive chemical make-up costs. Generally, operation of both the transfer reaction column and the reduction column 40 within a temperature range of from about 0°C to about 100°C is allowable, and operation within a range of from about 0°C to about 75°C is preferred. For some very stable amines and amine salts used as transfer reactants, operation well over 100°C is permissible.

Both the transfer reaction and the reduction reaction can be carried out either at atmospheric pressure or at high pressure levels. The upper pressure limit is set by high operating and equipment installation costs. When the partial pressure of hydrogen sulfide exceeds its vapor pressure at a temperature level in use, hydrogen sulfide will condense to a liquid, but this is not altogether detrimental. Generally speaking, the operation can be carried out in a pressure range of from atmospheric pressure to about 2000 psi. More suitably, the transfer reaction and the reduction reactions are carried out at a pressure between atmospheric pressure and about 300 psi. Operation at a moderate pressure level of, for example, about 300 psi, enhances both the rate of the reduction reaction and the absorption efficiency. The manner of operating the reduction column is flexible in that both the absorption section 42 and the reduction section 44 can be operated at different or the same pressure levels. The same is true of the operation of the transfer reaction column 30 and the reduction column 40 — that is, these columns may be operated at the same temperature and pressure levels or at different temperature and pressure levels.

The process of the present invention is a closed system with respect to the removal (scrubbing) reactant, the transfer reactant and the organic solvent in which it is dissolved, and any modifiers included therein. The amines, amine sulfite salts, diluents and modifiers, as well as the organic solvent itself, are all substantially insoluble in water, and such very small amouants of these reactants and solvents which may dissolve in the aqueous phase are nevertheless retained in that phase so that so long as sufficient care is exercised to not expose the aqueous phase to a temperature level sufficiently high to cause substantial decomposition or vaporization, they well return to the recovery system and no loss to the system is incurred.

Figure 3:
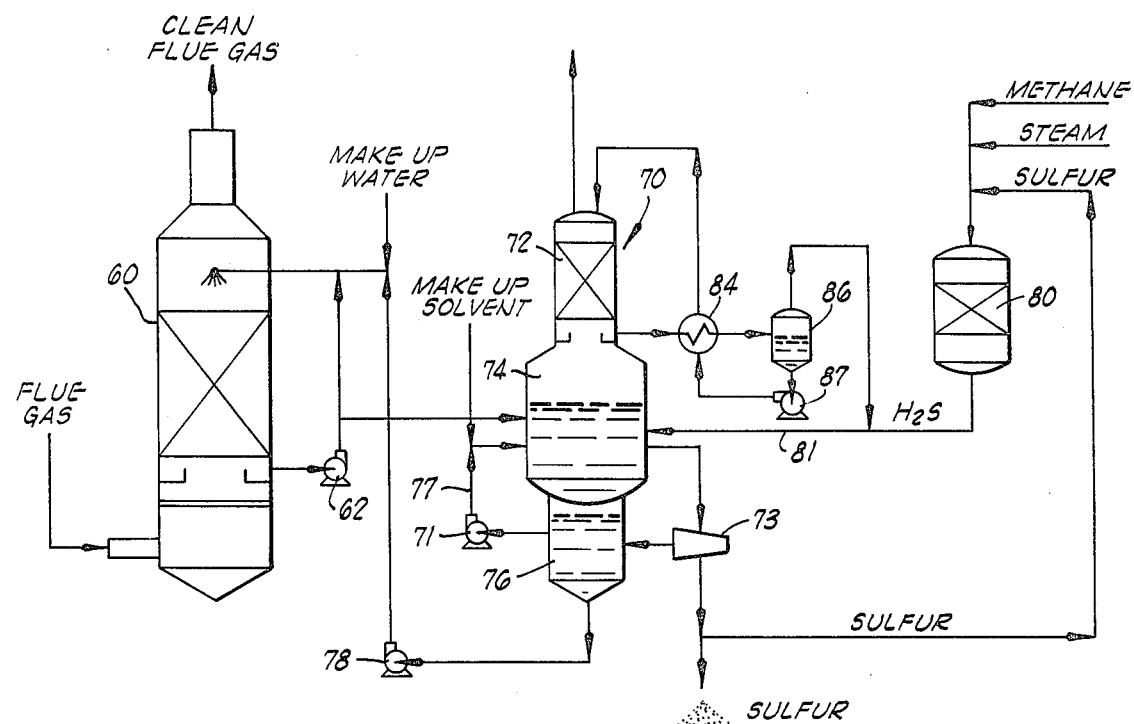
FIG. 3 is a process flow diagram of one embodiment of the process of my invention as it is carried out with transfer and reduction taking place in one single step.

As has been implied at certain portions of the foregoing discussion, it is often beneficial and very desirable (as, for example, to obtain maximum advantage resulting from the presence and action of certain dynamic influences) to carry out the transfer reaction and the reduction reaction concurrently in a single reaction zone. Further, this simplifies the overall process scheme. This mode of operation is illustrated in FIG. 3 of the drawing. The use of this system will be described referring, for purposes of discussion, to a typical use of disodium monohydrogen phosphate as a typical removal reactant, and alkyl amine phosphate as a transfer reactant. An effluent gas stream from which sulfur dioxide is to be removed is charged to a conventional scrubber column 60 where it is scrubbed by the disodium monohydrogen phosphate scrubbing solution in the manner hereinbefore described. The scrubbing reaction occurs in accordance with Reaction (9), and a slip stream of the spent scrubbing liquor is withdrawn from the scrubbing column 60 in the manner previously described. The slip stream is removed by a pump 62 and is charged to a transfer-reduction column 70 in which the transfer reaction and the reduction reaction occur concurrently in a common zone.

In the transfer-reduction column 70, there is included an absorption section 72 in the upper portion of the column in which the unreacted hydrogen sulfide gas is absorbed and recovered as in the case of the absorption section 42 used in the reduction column 40 of the system illustrated in FIG. 1 and hereinbefore described. The column 70 further includes a central transfer-reduction section 74 where the transfer reaction and the reduction reaction both predominantly occur. A lowermost section 76 is provided in the column 70 and constitutes a zone for phase separation between an organic phase and aqueous phase. Hydrogen sulfide gas is admitted via a conduit 81 beneath the liquid in the transfer-reduction section 74 of the column 70 in the manner hereinbefore described.

In the transfer-reduction section 74 of the column 70, hydrogen sulfide is dispersed in the reaction mixture therein. The described transfer reaction occurs, leading to the formation of alkyl amine sulfite, and reduction of the alkyl amine sulfite takes place to produce elemental sulfur. The transfer and reduction reactions which occur concurrently are complex because of the multivalency of both the phosphorus and the sulfur, and as a consequence, many intermediate species coexist in the transfer-reduction section of the column. Normally, the reactions here occurring are though to be as follows:

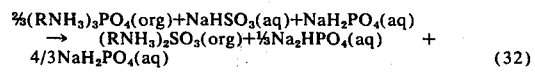
(32)

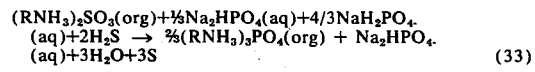
(33)

where $NaHSO_3(aq)$ and $NaH_2PO_4(aq)$ in Reaction (32) represent spent scrubbing liquor obtained via Reaction (9).

The temperature and pressure considerations hereinbefore discussed in referring to the system of FIG. 1 are also valid in the mode of operation illustrated by FIG. 3 where the transfer and reduction reactions are carried out concurrently in a common zone. As sulfur is yielded by the reduction reaction and precipitates from the reaction mixture in the section 74 of the column 70, a moderately thick, yet pumpable slurry is produced. As previously described, the slurry is removed from the lower portion of the section 74 and is directed to a suitable separatory device, such as the centrifuge 73. Here, the solid sulfur is separated from the water and organic solvent carrying the transfer reactant, and the aqueous and organic solutions are admitted to the lowermost section 76 of the transfer-reduction column 70. Here, two liquid layers which include an aqueous phase and an organic phase separate quickly. The aqueous phase, constituted primarily of an aqueous solution of sodium monohydrogen phosphate, is recycled by a suitable pump 78 to the top of the scrubbing column 60, and the organic layer, containing the transfer reactant, is recycled by a suitable pump 71 via conduit 77 to the central transfer-reduction section 74 of the column 70. Make-up water and organic solvent streams can be introduced to the respective streams recycled to the column 60 and the transfer-reduction section 74 of the column 70.

The unreacted hydrogen sulfide which passes upwardly from the transfer-reduction section 74 is recovered by absorption, preferably using an independent absorption loop as hereinbefore described. The absorption loop shown in FIG. 3 includes the heat exchanger 84 and a heat tank 86 along with a suitable recycling pump 87. Also, as previously described, the hydrogen sulfide needed for the reduction reaction is generated by reacting a portion of the sulfur product with methane and steam in a hydrogen sulfide generator 80. The gas eluted from the top of the transfer-reduction column 70 may be discharged directly to the atmosphere, or it may be admitted to the combustion chamber of a boiler as hereinbefore described.

When ammonia is employed as the removal reactant and the scrubbing liquor comprises essentially an aqueous solution of ammonium sulfites, it is then desirable to operate the central transfer-reduction section 74 and the absorption section 72 above a temperature of about 130°F so that ammonia and hydrogen sulfide do not combine. It is further desirable to absorb the hydrogen sulfite in the absorption section 72 by the use of an absorption medium which has a satisfactory absorption capacity at a temperature above 130°F. An aqueous solution of ethanol amine is, among others, suitable for this application. Long chain alkyl amines normally do not have sufficient absorption capacity at this elevated temperature. The ammonia gas which is emitted from the top of the absorption section 72, as it is liberated by carrying out the transfer-reduction reaction at the elevated temperature, is recycled to the absorption column 60.

In the foregoing embodiment of the invention, hydrogen sulfide is directly admitted to the water immiscible organic layer to reduce the organic sulfite salt formed in the transfer reaction step. As hereinbefore mentioned, hydrogen sulfide may be instead carried into the transfer reaction zone by reason of having previously been introduced into the scrubbing liquor, or by having been previously absorbed in the transfer reactant used in the transfer reaction. In the former case (i.e., preabsorption in the scrubbing liquor), the hydrogen sulfide gas may either be admitted directly to the scrubbing liquor or introduced thereto indirectly by pre-dissolving the hydrogen sulfide in an organic alkyl amine solution similar to that used in the transfer reaction.

In some instances, pre-absorption of hydrogen sulfide in the scrubbing liquor (either directly or indirectly) offers a beneficial effect because it enables a greater amount of elemental sulfur to be yielded in the subsequent transfer-reduction steps. Thus, when ammonia or ammonium hydroxide is used as the removal reactant and ammonium sulfite is the main constituent in the scrubbing liquor, pre-absorption of hydrogen sulfide by direct admission may be represented as follows:

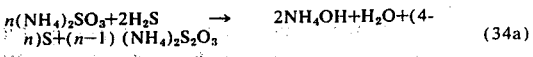

$$n(NH_4)_2SO_3 + 2H_2S \rightarrow 2NH_4OH + H_2O + (4-n)S + (n-1)(NH_4)_2S_2O_3 \quad (34a)$$

When the hydrogen sulfide is indirectly admitted and hydrogen sulfide is first dissolved in an alkyl amine forming an amine sulfide, the corresponding reaction is:

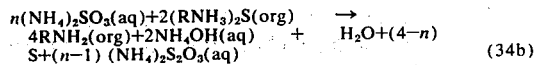

$$n(NH_4)_2SO_3(aq) + 2(RNH_3)_2S(org) \rightarrow 4RNH_2(org) + 2NH_4OH(aq) + H_2O + (4-n)S + (n-1)(NH_4)_2S_2O_3(aq) \quad (34b)$$

where $n$ is the number of moles of ammonium sulfite entering the pre-reduction reaction. This reaction shows that if the mole ratio of sulfite with respect to the sulfide is not less than 2, sulfur precipitation does not occur in the pre-absorption step.

The ammonium thiosulfate produced by Reactions (34a) and (34b) enters into the transfer reaction which subsequently occurs in the transfer reaction zone as follows:

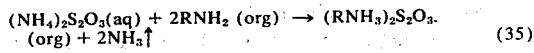

$$(NH_4)_2S_2O_3(aq) + 2RNH_2 \text{ (org)} \rightarrow (RNH_3)_2S_2O_3(org) + 2NH_3\uparrow \quad (35)$$

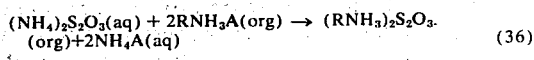

$$(NH_4)_2S_2O_3(aq) + 2RNH_3A(org) \rightarrow (RNH_3)_2S_2O_3(org) + 2NH_4A(aq) \quad (36)$$

and the subsequent reduction reaction is then

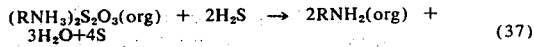

$$(RNH_3)_2S_2O_3(org) + 2H_2S \rightarrow 2RNH_2(org) + 3H_2O + 4S \quad (37)$$

Reaction (37) yields 4 moles of elemental sulfur per mole of thiosulfate instead of 3 moles of the sulfur product per mole of sulfite, which is the yield obtained when reduction Reaction (19) is the type of reduction reaction effected. It will thus be seen that the transfer of a given number of moles of thiosulfate salt into the organic phase employed in the transfer reaction, as compared with the same number of moles of sulfite salt, will yield 33 percent more elemental sulfur in the subsequent reduction with hydrogen sulfide. In the following embodiment of the invention, the described hydrogen sulfide pre-absorption step is incorporated in the process scheme.

It has previously been mentioned herein that where the volume of the gaseous mixture to be treated is extremely large, it is of substantial advantage to use the aerosol-former-scrubbing apparatus of the present invention as has been discussed hereinbefore in detail. In the following preferred embodiment of the present invention using this apparatus, ammonia is employed as the aerosol formation reactant.

Figure 4:
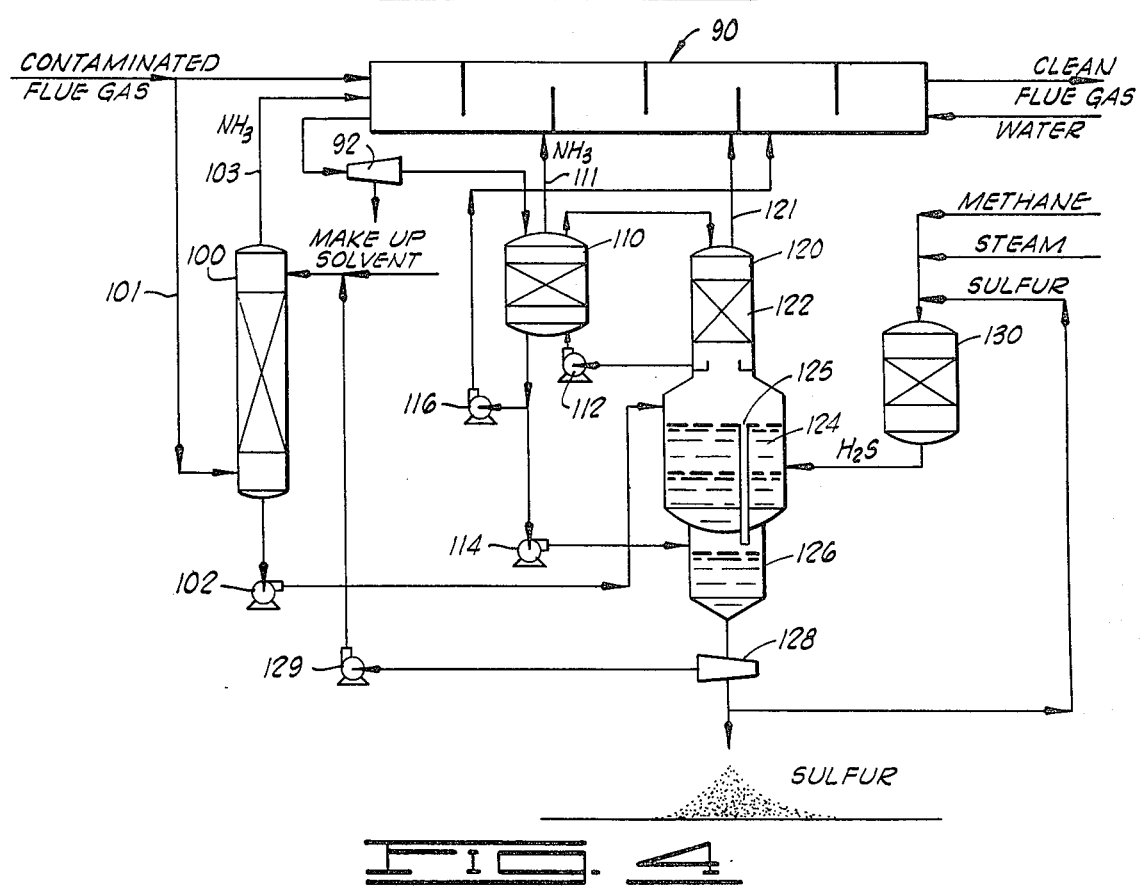
FIG. 4 is a process flow diagram of another embodiment of my invention illustrating the manner in which the aerosol-former-scrubbing apparatus may be incorporated into the process. The process is particularly suitable for large source applications.

The manner in which a system of this type is utilized is illustrated in FIG. 4 of the drawing. An aerosol-former-scrubbing apparatus 90 of the type illustrated in greater detail in FIG. 2 in here in use, and receives contaminated flue gas from which sulfur dioxide is to be removed. Recycled ammonia from points downstream in the process, together with make-up ammonia gas, is introduced at several points along the aerosol-former-scrubbing apparatus as will be more fully described hereinafter. In the aerosol-former-scrubbing apparatus, ammonia combines with sulfur dioxide (and such small quantities of sulfur trioxide as may be present) to form an ammonium sulfite (and some small quantities of ammonium sulfate derived from reaction with sulfur trioxide) aerosol which is subsequently dissolved into the aqueous scrubbing solution in the pool which is located at the bottom of the aerosol-former-scrubbing apparatus as previously described. Water can be introduced at one or several points in the scrubbing apparatus.

The pregnant scrubbing liquor from the aerosol-former-scrubbing apparatus 90 can be beneficially passed through a centrifuge 92 or other suitable separatory device, to remove ash or other solid materials from the spent scrubbing liquor. The spent scrubbing liquor is then charged to a contactor 110. In the contactor 110, the scrubbing liquor flows downwardly countercurrent to a stream of amine sulfide (or other hydrogen sulfide containing medium) delivered to the bottom of the contactor by a suitable pump 112. In the contactor 110, the ammonium sulfite is reduced to ammonium thiosulfate and the long chain alkyl amine, where used to carry the hydrogen sulfide, is regenerated according to Reaction (34b). Here, it is preferable to maintain the mole ratio of ammonium sulfite to amine sulfide at slightly higher than 2 in order to avoid the formation of elemental sulfur.

Ammonia gas emitted from the top of the contactor 110 is recycled back to the aerosol-former-scrubber apparatus 90 through a conduit 111. The regenerated alkyl amine is recycled from the top of the contactor 110 to an absorption section 122 of a reduction reaction column 120 for absorbing additional hydrogen sulfide to yield more amine sulfide for use in the contactor step. This absorption has been previously described, as has the production of amine sulfide. The aqueous solution which is discharged from the bottom of the contactor 110 is essentially an ammonium thiosulfate solution. A major portion of this aqueous solution is recycled by a suitable pump 116 to the aerosol-former-scrubbing apparatus 90 to aid in dissolving more of the product aerosol. Recycling of the aqueous ammonium thiosulfate solution from the contactor to the scrubbing zone in this fashion enhances the overall thiosulfate concentration in the spent scrubbing liquor. A substantial slip stream of the spent scrubbing liquor from the contactor 110 is, however, sent ultimately to the transfer reaction column 100 via the bottom section 126 of the reduction reaction column 120. The reason for this indirect routing of the aqueous ammonium thiosulfate slip stream will be further discussed hereinafter. As pointed out above, instead of the amine sulfide solution being charged to the contactor 110, gaseous hydrogen sulfide can be directly preabsorbed in the pregnant scrubbing liquor.

The structure of the reduction reaction column 120 shown in FIG. 4 is essentially the same as the structure of the column 70 previously referred to in discussing the system shown in FIG. 3. The column 120 thus includes an upper hydrogen sulfide absorption section 122, a central reduction reaction section 124 and a lowermost separatory section 126. In the lowermost section 126, the reduction product (the sulfur containing slurry hereinbefore described) is admitted via a down pipe 125 from the reduction section 124 above, and the spent scrubbing liquor slip stream from the contactor 110 is commingled with such slurry. It has been found that admission of the aqueous ammonium thiosulfate slip stream from the contactor at this point promotes coagulation of the particulate sulfur product of the reduction reaction, and causes more of the sulfur to precipitate out in a readily recovered form in a shorter time than when such thiosulfate contact is not employed.

Following the commingling of the sulfur containing slurry with the aqueous ammonium thiosulfate solution constituting a slip stream from the contactor 110, the total commingled mixture is discharged from the column 120 and is passed to a separatory device, such as a centrifuge 128, where the elemental sulfur is removed. The liquid phase recovered from the centrifuge 128 and containing both the aqueous ammonium thiosulfate solution and the organic solution of the transfer reactant is then pumped to the top of the transfer reaction column 100 by a suitable pump 129.

In the transfer reaction column 100, ammonia gas is stripped from the reaction mixture by a side stream of the hot flue gas derived from the main stream being charged to the aerosol-former-scrubbing apparatus, which hot flue gas is admitted to the bottom of the transfer reaction column through a conduit 101. The transfer reaction then proceeds in the column 100 in accordance with Reaction (15) where M is, in this instance, an ammonium ion. The ammonia gas stripped from the reaction mixture in the transfer column 100 is recycled to the aerosol-former-scrubbing apparatus through a conduit 103. Concurrently with the stripping of the ammonia from the reaction mixture in the transfer column 100, water is similarly removed therefrom by stripping. Substantially all of the water present is removed in this way.

The reaction products of the transfer reaction, constituting the organo-sulfite compounds dissolved in a suitable organic solvent are discharged from the transfer column and pumped by a suitable pump 102 to the reduction section 124 of the reduction reaction column 120. Hydrogen sulfide is admitted to this section of the reduction reaction column at a point below the liquid level therein. It should be noted that sufficient hydrogen sulfide, generated in the manner hereinbefore described in a hydrogen sulfide generator 130, must be admitted to the reduction section 124 to provide an adequate amount of this reducing agent to effect the necessary reduction of the transfer reaction product in the reducing section, as well as to provide hydrogen sulfide needed in the contactor 110. The gas which is emitted from the absorption section 122 of the reduction column 120 is charged to the aerosol-former-scrubbing apparatus through a conduit 121 so that any ammonia present in the gas vented from the reduction reaction column 120 can be conserved and used in the scrubbing reaction.

Before setting forth examples of the practice of the process of the present invention in order to further clarify and illustrate the basic principles underlying the invention, it is desirable to take note of several previously undiscussed aspects of the invention. First, in those instances where sulfur dioxide is to be removed from a relatively small stream of mixed gases in which the sulfur dioxide concentration is relatively high, the removal reactant or scrubbing solution employed can beneficially be one which is substantially the same as the transfer reactant — i.e., an amine base (or quaternary ammonium base) dissolved in a suitable organic diluent, such as kerosene. In such instances, the temperature at which the scrubbing of the gaseous mixture is carried out should be kept below about 185°F, and preferably below about 140°F, to avoid breakdown or decomposition of the amine sulfite which is formed in the scrubbing. Consequently, the gaseous mixture charged to the scrubbing step of the process should be precooled sufficiently that excessive heating of the organic scrubbing liquor (above the temperatures described) does not occur. Where this type of procedure is used in which a free amine or free quaternary ammonium base is employed as the removal reactant, the spent scrubbing liquor, which is essentially an organic solution of an amine sulfite or a quaternary ammonium sulfite or hydrosulfite, can be reduced directly by contact with hydrogen sulfide as hereinbefore described. In other words, this mode of proceeding effectively eliminates the transfer reaction hereinbefore described.

It should also be pointed out that the transfer-reduction procedure which has been hereinbefore described has utility and value independently of the scrubbing step which is, of course, essential in the sense of removing sulfur dioxide gas from a gaseous mixture. This is mentioned here because the transfer-reduction procedure is, itself, believed to be a novel technique for procuring elemental sulfur from a starting material consisting essentially of certain types of water soluble sulfur compounds, such as those described as the products yielded by the scrubbing step forming a part of the sulfur dioxide removal method of the present invention. In other words, an aqueous solution of water soluble sulfur compounds in which the anion includes a sulfur atom having a valence of between +4 and −2 can be made the source of elemental sulfur by using the same as a charge stock to the transfer and reduction reactions of the present invention, and this independently of the source from which the starting material aqueous solution is derived. In such instances, the counter cation of the sulfur containing anion described can be ammonium or alkali metal ions as hereinbefore discussed.

The advantages attained through the practice of the present invention are many and significant. The equipment size and complexity are such that relatively low capital investment is required for carrying out the process. Moreover, the operating costs entailed are low and very high efficiencies are obtained in the removal of sulfur dioxide from gaseous mixtures. Further, the simplicity of the apparatus in the process assures high reliability for continued and uninterrupted operation, a factor particularly significant for utility companies, as well as in many industrial operations. The transfer-reduction technique at the heart of the process of the invention has, in itself, many advantages, including effective reduction of the sulfite compounds to elemental sulfur at a rapid rate; elimination of disposal problems through the production of easily handled solid sulfur which is easily disposed of or marketed; operation at room temperature without the consumption of steam or other fuel source for providing heat; minimization of undesirable sulfate product formation, and minimal losses of reactant components due to the closed system character of the process, and the regeneration and recycling of reactants.

The following examples will further illustrate typical practice of the invention.

EXAMPLE 1

Employing the system illustrated in FIG. 1, approximately 240 thousand standard cubic feet per minute of the flue gas generated by a 100mw power plant which burns a 3 weight percent sulfur coal is treated. The flue gas is discharged at a temperature of 300°F, and is constituted on a per minute basis of essentially 4,190 pounds of carbon dioxide, 99.6 pounds of sulfur dioxide, 598 pounds of oxygen, 14,120 pounds of nitrogen and 891 pounds of water vapor. The flue gas is charged to the bottom of a conventional scrubber and moves upwardly countercurrent to the scrubbing liquor. About 80 percent of the sulfur dioxide in the flue gas is removed, and the clean flue gas, consisting essentially of 4,190 pounds (per minute) of carbon dioxide, 21.1 pounds of sulfur dioxide, 598 pounds of oxygen, 14,120 pounds of nitrogen and 1,780 pounds of water vapor, is eluted from the top of the scrubbing column at about 128°F.

The scrubber consists of three separate absorption stages. At each stage, the scrubbing liquid flows downwardly from the top countercurrent to the flow of rising flue gas, and is collected in a sump situated at the bottom of each stage. From the sump, a portion of approximately 4/5 of the liquid is recycled by a suitable pump to the top of the same stage, and another portion of approximately 1/5 of the liquid is charged to the top of the next lower stage. Thus, while a major portion of the scrubbing liquid is constantly recycling within the stage, there is a minor portion of the scrubber liquid passing downwardly from stage to stage and eventually withdrawn from the bottom of the scrubbing column for regeneration treatment.

To the top of the first stage of the scrubbing column there is, each minute, admitted a stream of regenerated scrubbing liquid consisting of 245 pounds of normal sodium sulfite, 202 pounds of sodium hydrosulfite, 77.5 pounds of sodium thiosulfate and 1,529 pounds of water at 70°F (derived from recycling), along with 888 pounds of make-up water at 70°F. These inflow streams, in admixture with the recycling scrubbing liquid, flow downwardly inside the column as hereinbefore described. A slip stream of the pregnant scrubbing liquid from the bottom of the third absorption stage containing 89.5 pounds of normal sodium sulfite, 458 pounds of sodium hydrosulfite, 77.5 pounds of sodium thiosulfate and 1,529 pounds of water is withdrawn from the column each minute and is initially sent through a centrifuge where ash materials are removed. It is next cooled to 70° before it is charged to the top of a transfer reaction column.

To the bottom of the transfer reaction column is charged, each minute, a regenerated organic transfer reactant solution consisting of 730 pounds of Primene, 347 pounds of Primene thiosulfate and 900 pounds of kerosene at 70°F. The volume ratio of the total Primene present in the organic solution to the kerosene solvent is 1. Primene here designates Primene JMT, which is the trade name of a commercially available isomeric mixture of tertiary alkyl primary amines having a carbon chain length ranging from $C_{18}$ to $C_{22}$. This amine is marketed by the Rohm and Haas Co. of Philadelphia, Pennsylvania. It has excellent solubility in most organic solvents, and extremely low solubility in the aqueous phase. Its average molecular weight is about 300, and the specific gravity is 0.834.

In the transfer reaction column, the aqueous pregnant scrubbing liquid flows downwardly while the organo-transfer solution flows upwardly in a countercurrent manner. Intimate contact between the two phases is maintained. From the bottom of the transfer column, the regenerated scrubbing liquid is recycled to the top of the scrubbing column, as described. From the top of the transfer column, an organic stream consisting of 831 pounds Primene sulfite, 347 pounds Primene thiosulfate and 900 pounds of kerosene is charged each minute to the bottom reduction section of the reduction column wherein it is reduced.

In the reduction column, 119.8 pounds of hydrogen sulfide in admixture with 27.3 pounds carbon dioxide is admitted each minute beneath the liquid level in the reduction section, and the organo-sulfite salts are here reduced to elemental sulfur. The reaction is exothermic, and the reaction mixture is externally cooled to maintain the reaction mixture at substantially ambient temperature (70°F). The reaction mixture is a moderately thick sulfur slurry. It is removed from the bottom of the column, sent through another centrifuge to remove the elemental sulfur and recycled to the bottom of the transfer reaction column. Make-up solvent and Primene are added as needed to this recycling stream.

About 36 pounds per minute of hydrogen sulfide which is not consumed by reaction in the reaction section passes upwardly to the absorption section of the reduction column. The gas emitted each minute from the absorption section consists essentially of 27.3 pounds of carbon dioxide, and traces of hydrogen sulfide and methane. This gas mixture is admitted to a plant boiler furnace where the hydrogen sulfide and methane are consumed by oxidation.

Each minute within the absorption section of the reduction column, a kerosene solution containing 630 pounds of Primene and 570 pounds of kerosene flows downwardly in countercurrent flow to the rising hydrogen sulfide gas and the hydrogen sulfide is substantially completely absorbed. The pregnant absorption solution is next flowed through a heat exchanger where it is heated by the regenerated Primene bearing solvent and charged directly to a heat tank wherein it is further heated to about 122°F. At that temperature, 36 pounds per minute of hydrogen sulfide are released from solution and merged with the main hydrogen sulfide supply line flowing from an $H_2S$ generator. The regenerated absorption solvent is cooled down by the aforementioned heat exchanger and some external cooling to 70°F prior to recycling to the top of the absorption section of the reduction column.

Approximately ⅔ of the product sulfur (78.7 pounds per minute) is passed to the hydrogen sulfide generator. To this generator, 223 standard cubic feed of methane and 22.2 pounds of steam are also admitted each minute. The generator is a two-stage reactor in which the first stage is maintained at 1472°F, and the second stage at 572°F. The gas emitted each minute from the second stage, comprising 83.6 pounds hydrogen sulfide and 27.3 pounds carbon dioxide, is commingled with the hydrogen sulfide from the heat tank. The combined stream is next cooled to 70°F and then admitted to the reduction section of the reduction column. The net elemental sulfur produced by the process is 39.4 pounds.

In the above example, the transfer reaction and the reduction reaction are carried out as two separate steps. The steps can be combined, and transfer and reduction effected concurrently in a single zone as shown in FIG. 3, using, as described, disodium monohydrogen phosphate as a typical removal reactant and alkyl amine phosphate as a typical transfer reactant. Generally speaking, the operation of the process to carry out the transfer and reduction reactions concurrently is more smooth and more effective because of the dynamic impetus hereinbefore discussed. Specific removal reactants, in addition to those previously described, are set forth in Table I, and suitable transfer reactants are listed in Table II.

TABLE I

| Salts | Examples of Removal Reactants Parent Acid | pKa of Parent Acid |
|---|---|---|
| sodium carbonate | $HCO_3^-$ | 10.25 |
| sodium sulfide | $HS^-$ | 11.96 |
| sodium hydrosulfide | $H_2S$ | 7.04 |
| potassium sulfide | $HS^-$ | 11.96 |
| potassium hydrosulfide | $H_2S$ | 7.04 |
| sodium acetate | HAc | 4.75 |
| sodium sulfite | $HSO_3^-$ | 6.91 |
| potassium sulfite | $HSO_3^-$ | 6.91 |
| ammonium sulfite | $HSO_3^-$ | 6.91 |
| rubidium sulfite | $HSO_3^-$ | 6.91 |
| potassium monohydrogen phosphate | $H_2PO_4^-$ | 7.21 |
| ammonium monohydrogen phosphate | $H_2PO_4^-$ | 7.21 |
| lithium monohydrogen phosphate | $H_2PO_4^-$ | 7.21 |
| | Others | |
| methyl amine | | |
| ethyl amine | | |
| diethyl amine | | |
| propyl amine | | |
| ethanol amine | | |
| butyl amine | | |
| sodium hydroxide | | |

TABLE II

| Transfer Reactant | Examples of Transfer Reactants Class | Carbons |
|---|---|---|
| t-octylamine | t-alkyl primary amine | $C_8$ |
| t-dodecylamine | t-alkyl primary amine | $C_{12}$ |
| 1-(3 ethyl-pentyl)-4-ethyloctylamine | primary amine | $C_{17}$ |
| di(n-decyl) amine | secondary amine | $C_{20}$ |
| n-dodecyl isooctylamine | secondary amine | $C_{20}$ |
| N-benzyl-1-(3-ethyl-pentyl)-4-ethyloctyl amine | secondary amine | $C_{24}$ |
| methyl di(n-octyl) amine | tertiary amine | $C_{17}$ |
| n-octadecyl dimethyl amine | tertiary amine | $C_{20}$ |
| t-octyl dimethyl amine | tertiary amine | $C_{10}$ |
| tris (tridecyl) amine [mixed $C_{13}$ alkyls from tetrapropylene by the oxo process] | tertiary amine | $C_{39}$ |
| trioctyl methyl ammonium hydroxide | quaternary base | $C_{25}$ |
| tridecyl methyl ammonium hydroxide | quaternary base | $C_{31}$ |
| trioctyl methyl ammonium carbonate | quaternary salt | $C_{25}$ |
| di(n-decyl) amine phosphate | secondary amine salt | $C_{20}$ |
| methyl di(n-octyl) amine phosphate | tertiary amine salt | $C_{17}$ |

EXAMPLE II

Employing a system of the type broadly and schematically illustrated in FIG. 4, approximately 2.4 million standard cubic feet per minute of flue gas generated by a 1,000 mw power plant using a 3 weight percent sulfur coal is treated. The quantities hereinafter mentioned are those contacted, treated, reacted or produced each minute. The flue gas is discharged at a temperature of 300°F, and is made up of 41,900 pounds of carbon dioxide, 996 pounds of sulfur dioxide, 5,970 pounds of oxygen, 141,200 pounds of nitrogen and 8,910 pounds of water vapor. The flue gas is charged to the aerosol-former-scrubbing apparatus. 520 pounds of ammonia, a small portion of which is make-up, and the remainder of which is recycled ammonia, is charged to the former-scrubbing apparatus. Thus, the molar ratio of ammonia to sulfur dioxide and sulfur trioxide admitted to the former-scrubber is maintained at approximately 2.

In the aerosol former-scrubbing apparatus, the sulfur dioxide reacts with ammonia and water vapor, which is present in large excess, to form an ammonium sulfite aerosol which dissolves in the scrubbing solution in the pool located in the bottom of the former-scrubbing apparatus. 98 percent of the sulfur dioxide in the flue gas is removed, and the clean flue gas, consistinf of essentially 41,900 pounds of carbon dioxide, 5,970 pounds of oxygen, 141,200 pounds of nitrogen, 17,730 pounds of water vapor and 19.2 pounds of $SO_2$ is eluted from the other end of the apparatus at about 128°F. 7,520 pounds of make-up water are charged to the aerosol-former-scrubbing apparatus at various entry points of the apparatus. This amount of water is vaporized into the flue gas and discharged to the atmosphere. In the pool at the bottom of the apparatus, the liquid slowly flows from the gas discharge side of the apparatus to the side at which the gas enters, and such flow is countercurrent to the general direction of the gas flow through the apparatus. At the gas entering end of the apparatus, the liquid is maintained at a temperature of 150°F by external cooling, and a portion of the scrubbing solution is withdrawn therefrom for sulfur recovery treatment.

The pregnant scrubbing solution, containing 1,779 pounds of ammonium sulfite, 4,540 pounds ammonium thiosulfate and 5000 pounds of water, is initially sent through a centrifuge, where ash materials are removed. It is next cooled to about 70°F and is charged to a contactor. In the contactor, the scrubbing liquor is intimately contacted with a solution in which 4,800 pounds of Primene sulfide are dissolved in 4,100 pounds of kerosene. In this organic solution, the volume ratio between the Primene (present in the Primene sulfide) and kerosene is approximately 1.

130 pounds of ammonia gas released from the contactor are recharged to the aerosol-former-scrubbing apparatus and constitute a portion of the recycled ammonia hereinbefore described. The contactor product contains 6,230 pounds of ammonium thiosulfate and 5,210 pounds of water. 73 volume percent of this stream is recycled to the aerosol-former-scrubbing apparatus, and the remainder is withdrawn as a slip stream for sulfur recovery treatment.

The slip stream consists of 1,701 pounds of ammonium thiosulfate and 1,420 pounds water and is admixed with the spent organic solution in the bottom section of the reduction column. This liquid mixture, which additionally contains 12,560 pounds of Primene, 2,170 pounds of Primene thiosulfate, 311 pounds of Primene sulfide, 13,200 pounds kerosene and 1,468 pounds of elemental sulfur from the spent reduction liquor, is a moderately thick slurry. After the removal of the elemental sulfur by centrifuge, the liquor, which includes both organic and aqueous phases, is sent to the transfer column where both ammonia and water are stripped off, and thiosulfate is simultaneously transferred into the organic phase by the transfer reaction of the invention.

In the transfer reaction column, the $(NH_4)_2S_2O_3$ interacts with Primene, and ammonia is released. Concurrently, a side stream of 116,200 standard cubic feet of untreated flue gas is admitted to the transfer reaction column to strip out the ammonia. External heat is added so that the liquid phase in the transfer reaction column remains at a temperature of approximately 140°F. 391 pounds of ammonia are stripped from the reaction liquid mixture, together with 1,420 pounds of water, and the mixture of ammonia, water vapor and the stripping flue gas is discharged from the transfer reaction column and is recycled to the aerosol-former-scrubbing apparatus. Make-up ammonia is added as necessary to compensate for any mechanical loss in the operation.

The product Primene thiosulfate solution from the transfer reaction column, consisting of 10,300 pounds of Primene thiosulfate, 5,750 pounds of free Primene, 311 pounds of Primene sulfide and 13,200 pounds of kerosene, is charged to the central section of the reduction column where it is reduced by hydrogen sulfide to elemental sulfur. The resultant mixture in the reaction section overflows through a down pipe to the lower section wherein it is admixed with the slip stream of the spent scrubbing liquor from the contactor.

The unreacted hydrogen sulfide, which amounts to 260 pounds, flows upwardly to the absorption section where it is absorbed by a recycle stream of 50 volume percent Primene solution consisting of 4,540 pounds of Primene and 4,100 pounds of kerosene. The hydrogen sulfide is here converted to Primene sulfide which is charged to the contactor.

336 pounds of carbon dioxide, mixed with trace amounts of hydrogen sulfide and methane from the reduction column are passed to a plant boiler where hydrogen sulfide and methane are burned.

Two-thirds of the elemental sulfur (979 pounds) is recycled to the hydrogen sulfide generator where it is reacted with 2,770 standard cubic feet of methane and 275 pounds of steam to yield 1,040 pounds of hydrogen sulfide and 336 pounds of carbon dioxide. This stream of hydrogen sulfide gas is cooled to 70°F and admitted to the central section of the reduction section. The net sulfur yield from the process is 489 pounds.

Although certain preferred embodiments of the present invention have been herein set forth and various reaction and process conditions and parameters have been specifically identified by way of example and not limitation, it is to be understood that such descriptions and identifications have been made for the purpose of elucidating and making clear the basic principles which underlie the invention. Changes and innovations in the process schemes, apparatus and reaction conditions which do not depart from these basic principles are therefore deemed to be circumscribed by the spirit and scope of the invention, except as the same may be necessarily limited by the appended claims or reasonable equivalents thereof.

What is claimed is:

1. A process for removing sulfur dioxide from a gaseous mixture comprising:
   contacting the gaseous mixture in a scrubbing zone in the presence of water with at least one removal reactant selected from the group consisting of aqueous solutions having a pH of at least 4.0 of a salt of a weak acid and an alkali metal hydroxide, said weak acid precursor of said salts being an acid having an ionization constant (pKa) value of at least 4.0, to form an aqueous solution of a sulfur-containing salt;
   contacting said aqueous solution of a sulfur-containing salt with an organic liquid phase which includes at least one nitrogen-containing, water immiscible, organic compound which does not form a stable emulsion with water and which is selected from the group consisting of (a) alkyl amines containing from about 12 to about 45 carbon atoms and having a solubility in water of less than 0.2 gm per 100 gms of water at 25°C, and (b) salts of said amines having a solubility of less than 5 gms per 100 gms of water at 25°C, to yield by a transfer reaction, an organic liquid phase containing at least one sulfur-containing salt of said nitrogen compound; then contacting said last-mentioned organic phase containing at least one sulfur-containing salt of said nitrogen compound with hydrogen sulfide to reduce the sulfur-containing salts therein to elemental sulfur and regenerate said nitrogen-containing organic compound.

2. A process for removing sulfur dioxide as defined in claim 1 wherein said nitrogen-containing organic compound is a tertiary alkyl primary amine.

3. A process for removing sulfur dioxide as defined in claim 1 and further characterized as including the step of recycling to the zone of contact of the aqueous solution with the organic liquid phase, the regenerated nitrogen-containing organic compound yielded by said hydrogen sulfide contact.

4. A process for removing sulfur dioxide as defined in claim 1 wherein said removal reactant is an aqueous solution of one of said salts derived from a weak acid having a pKa value of from about 5 to about 10.

5. A process for removing sulfur dioxide as defined in claim 4 wherein a portion of said elemental sulfur is converted to hydrogen sulfide used to contact said last mentioned organic phase to reduce the sulfur-containing salts therein to elemental sulfur.

6. A process as defined in claim 5 wherein said nitrogen-containing organic compound has a molecular weight of from about 180 to about 650.

7. A process as defined in claim 6 wherein said nitrogen-containing organic compound has a G value of at least 0.15.

8. A process as defined in claim 7 wherein said removal reactant is a salt containing the anion $-HPO_4^=$.

9. A process as defined in claim 9 wherein the removal reactant salt contains an alkali metal cation.

10. A process as defined in claim 9 wherein said nitrogen-containing organic compound is an alkyl amine phosphate.

11. A process as defined in claim 10 wherein said contact with hydrogen sulfide is carried out in the same zone as said transfer reaction, and the hydrogen sulfide reduction proceeds concurrently with said transfer reaction.

12. A process as defined in claim 7 wherein said removal reactant is a salt containing the anion $-SO_3^=$.

13. A process as defined in claim 12 wherein said nitrogen-containing organic compound is a primary alkyl amine.

14. A process as defined in claim 13 wherein said nitrogen-containing organic compound has a G value of at least 0.3.

15. A process as defined in claim 14 wherein said removal reactant is sodium sulfite.

16. A process as defined in claim 15 wherein said nitrogen-containing organic compound has a G value of at least 0.5.

17. A process as defined in claim 16 wherein said process is further characterized as including the steps of:

separating said organic liquid phase containing at least one sulfur-containing salt of said nitrogen compound from the aqueous phase resulting from the contact of said aqueous solution of a sulfur-containing salt with an organic liquid base, said separation of organic and aqueous phases being effected after the occurrence of said transfer reaction, and prior to contacting said last-mentioned organic phase with hydrogen sulfide;

recycling to the zone of contact of the aqueous solution with the organic liquid phase, the regenerated nitrogen-containing organic compound yielded by said hydrogen sulfide contact; and recycling said aqeuous solution of one of said salts as regenerated by said transfer reaction, to said scrubbing zone.

18. A process for removing sulfur dioxide as defined in claim 1 wherein said removal reactant is an aqueous solution of one of said salts and said process is further characterized as including recycling said aqueous solution of one of said salts, as regenerated by said transfer reaction, to said scrubbing zone.

19. A process for removing sulfur dioxide as defined in claim 1 and further characterized as including the step of converting a portion of the elemental sulfur to hydrogen sulfide for use in reducing said last-mentioned sulfur-containing salts to elemental sulfur.

20. The process defined in claim 1 wherein said nitrogen-containing organic compound is a quaternary alkyl ammonium compound having a G value greater than about 0.3.

21. The process defined in claim 1 wherein said nitrogen-containing organic compound is a liquid and constitutes the only compound in said organic liquid phase.

22. The process defined in claim 1 wherein said organic liquid phase consists essentially of said nitrogen-containing organic compound dissolved in a water immiscible organic solvent.

23. A process for removing sulfur dioxide as defined in claim 1 wherein said nitrogen containing organic compound has a G value of at least 0.15.

24. The process defined in claim 1 wherein the removal reactant is a salt containing the anion $SO_3^=$.

25. A process as defined in claim 1 wherein the removal reactant is a salt containing the anion $HPO_4^=$.

26. A process as defined in claim 1 wherein said nitrogen containing organic compound is an alkyl amine having a molecular weight of from about 180 to about 650.

27. The process defined in claim 1 wherein said nitrogen containing organic compound is an amine salt and said removal reactant is a weak acid salt having an anion identical to an anion of said amine salt.

28. The process defined in claim 1 wherein said aqueous solution of a sulfur-containing compound is contacted with said organic liquid phase to effect said transfer reaction at a temperature of from about 0°C to about 100°C.

29. The process defined in claim 1 wherein said aqueous solution of a sulfur-containing compound is contacted with said organic liquid phase to effect said transfer reaction at a pressure of from about atmospheric pressure to about 2000 psi.

30. The process defined in claim 1 wherein the hydrogen sulfide utilized to reduce the sulfur-containing salts to elemental sulfur is in the gaseous form, and wherein the process is further defined as including the steps of absorbing excess, unreacted hydrogen sulfide gas from the zone of the reduction reaction in an organic solution of an amine to form an organic solution of an amine sulfide; then heating the organic solution of an amine sulfide to decompose the amine sulfide to regenerate hydrogen sulfide.

31. The process defined in claim 2 wherein said tertiary alkyl primary amine is at least one tertiary alkyl primary amine containing from 18 to 22 carbon atoms.

32. The process defined in claim 4 wherein said weak acid has a pKa value of from about 7 to about 8.

33. The process defined in claim 22 wherein said water immiscible organic solvent is kerosene.

34. The process defined in claim 1 wherein said nitrogen containing organic compound has a G value of at least 0.5.

35. The process defined in claim 1 wherein the anion of said salt contains sulfur.

36. The process defined in claim 22 wherein said water immiscible organic solvent has dissolved therein an alkanol containing from about 12 to about 24 carbon atoms to promote the solubility of said nitrogen containing organic compound in said organic solvent.

37. The process defined in claim 30 wherein said nitrogen-containing organic compound is an alkyl amine and said last mentioned amine is the same alkyl amine as said nitrogen-containing compound.

38. A process for removing sulfur dioxide as defined in claim 23 wherein said nitrogen-containing organic compound has a G value of at least 0.3.

39. A process for removing sulfur dioxide as defined in claim 38 and further characterized as including the step of recycling said aqueous solution of one of said salts, as regenerated by said transfer reaction, to said scrubbing zone.

40. A process for removing sulfur dioxide as defined in claim 39 and further characterized as including the step of converting a portion of the elemental sulfur to hydrogen sulfide for use in reducing said last-mentioned sulfur-containing salts to elemental sulfur.

41. The process defined in claim 40 wherein said organic liquid phase consists essentially of said nitrogen-containing organic compound dissolved in a water immiscible organic solvent.

42. The process defined in claim 41 wherein said water immiscible organic solvent is kerosene.

43. The process defined in claim 42 wherein the removal reactant is a salt containing the anion $SO_3^=$.

44. The process defined in claim 43 wherein said nitrogen containing organic compound is an alkyl amine having a molecular weight of from about 180 to about 650.

45. The process defined in claim 44 wherein said aqueous solution of a sulfur-containing compound is contacted with said organic liquid phase to effect said transfer reaction at a temperature of from about 0°C to about 100°C.

46. The process defined in claim 45 wherein said aqueous solution of a sulfur-containing compound is contacted with said organic liquid phase to effect said transfer reaction at a pressure of from about atmospheric pressure to about 2000 psi.

47. A process for recovering solid elemental sulfur from an aqueous solution of one or more salts including a sulfur containing anion, and a cation selected from the group consisting of alkali metal, ammonium and alkyl ammonium ions, said process comprising:

contacting the aqueous solution with an organic liquid phase containing, as an active transfer reactant, at least one nitrogen-containing organic compound which includes a nitrogen atom bonded to from 1 to 4 alkyl substituents and which does not form a stable emulsion with water and which is selected from the group consisting of (a) alkyl amines having a solubility in water of less than about 0.2 gm per 100 gms of water at 25°C, (b) salts of said amines having a solubility of less than 5 gms per 100 gms of water at 25°C, (c) quaternary alkyl ammonium hydroxides having a solubility in water of less than 5 gms per 100 gms of water at 25°C, and (d) salts of said hydroxides having a solubility of less than 5 gms per 100 gms of water at 25°C, to yield an aqueous phase and an organic liquid phase containing an organic sulfur-containing reaction product of said nitrogen-containing compound;

passing hydrogen sulfide into said organic liquid phase containing said sulfur-containing reaction product to reduce the sulfur-containing reaction product to elemental sulfur.

48. The process defined in claim 47 wherein said contacting step is carried out in the same zone as, and concurrently with, the passage of hydrogen sulfide into said organic liquid phase.

49. The process defined in claim 47 wherein nitrogen-containing organic compound is a tertiary alkyl primary amine containing at least 8 carbon atoms.

50. The process defined in claim 47 and further characterized as including the steps of separating elemental sulfur from the organic liquid phase and aqueous phase; and converting a portion of the elemental sulfur to hydrogen sulfide for use in reducing said sulfur-containing reaction product to elemental sulfur.

51. The process defined in claim 47 wherein said first-mentioned organic liquid phase consists essentially of said nitrogen-containing organic compound dissolved in a water immiscible organic solvent.

52. The process defined in claim 51 wherein said nitrogen-containing organic compound has a G value of at least 0.15.

53. The process defined in claim 48 and further characterized as including the steps of separating the elemental sulfur from the effluent liquids from the zone in which the contacting and hydrogen sulfide reduction are concurrently effected;

separating the effluent liquids into an aqueous phase and an organic liquid phase;

recycling the last-mentioned organic liquid phase to the zone in which said contacting and reduction are concurrently carried out.

54. The process defined in claim 53 and further characterized in including the step of converting a portion of the separated elemental sulfur to hydrogen sulfide for passage into said last-mentioned organic liquid phase.

55. The process defined in claim 52 wherein said nitrogen containing organic compound contains a functional group selected from those defined by the formulae $RNH_2—$;

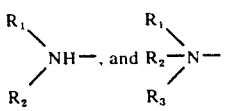

where $R_1 - R_3$ designate alkyl groups containing, in total, from about 8 to about 45 carbon atoms, and said nitrogen-containing organic compound has a G value of at least 0.3.

56. The process defined in claim 51 wherein said water immiscible organic solvent is kerosene.

57. The process defined in claim 47 wherein said first-mentioned salt is a thiosulfate salt produced by the step of contacting with $H_2S$, an aqueous solution of a salt containing an anion selected from the group consisting of sulfite and hydrosulfite and a cation selected from the group consisting of alkali metal, ammonium and alkyl ammonium ions.

58. The process defined in claim 47 wherein said first-mentioned salt is a thiosulfate salt produced by the step of contacting an aqueous solution of a salt containing an anion selected from the group consisting of sulfite and hydrosulfite and a cation selected from the group consisting of alkali metal, ammonium and alkyl ammonium ions with hydrogen sulfide absorbed in an organic liquid phase containing a water immiscible alkyl amine containing from about 8 to about 45 atoms, and having the characteristics of said nitrogen-containing organic compound.

59. The process defined in claim 58 wherein said first-mentioned salt is ammonium thiosulfate and is derived from an ammonium salt by the described contact with hydrogen sulfide absorbed in an organic liquid phase.

60. The process defined in claim 58 wherein said organic liquid phase in which the hydrogen sulfide is absorbed is identical to said first-mentioned organic liquid phase referred to in claim 51.

* * * * *

UNITED STATES PATENT OFFICE
CERTIFICATE OF CORRECTION

Patent No. 3,984,529          Dated October 5, 1976

Inventor(s) Shao E. Tung

It is certified that error appears in the above-identified patent and that said Letters Patent are hereby corrected as shown below:

Column 5, Equation (1), "$HSO_2^-$" should read -- $HSO_3^-$ --.

Column 6, Equation (4), "$HSO_2$" should read -- $HSO_3^-$ --.

Columns 5 and 6, Reaction (6), "$P_{SO}$" should read -- $P_{SO_2}$ --.

Column 6, line 68, "$P_{SO_2}$" should read -- $P_{SO_2}$ --.

Column 9, Reaction (12), move the designation "(12)" to the right-hand margin directly under the designation "(11)" of Reaction (11).

Column 16, Reaction (18), delete "$\lambda$ ".

Column 21, line 10, after "chain", delete the word "in".

Column 21, line 11, "sole" should read -- sold --.

Column 22, line 43, "partent" should read -- parent --.

Column 24, line 38, "additional" should read -- ADDITIONAL --.

Column 26, line 44, "though" should read -- thought --.

Column 33, line 46, "feed" should read -- feet --.

UNITED STATES PATENT OFFICE
CERTIFICATE OF CORRECTION

Patent No. 3,984,529       Dated October 5, 1976

Inventor(s) Shao E. Tung

It is certified that error appears in the above-identified patent and that said Letters Patent are hereby corrected as shown below:

Column 35, line 12, "consistinf" should read -- consisting --.

Column 37, line 45, "in claim 9" should read -- in claim 8 --.

Column 42, line 20, "51" should read -- 47 --.

Signed and Sealed this

Eighteenth Day of October 1977

[SEAL]

Attest:

RUTH C. MASON
Attesting Officer

LUTRELLE F. PARKER
Acting Commissioner of Patents and Trademarks